US008276075B2

(12) United States Patent
Mae et al.

(10) Patent No.: US 8,276,075 B2
(45) Date of Patent: Sep. 25, 2012

(54) APPARATUS, METHOD, AND COMPUTER PROGRAM FOR PROCESSING INFORMATION

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 645 days.

(21) Appl. No.: 11/821,559

(22) Filed: Jun. 21, 2007

(65) Prior Publication Data

US 2008/0022227 A1    Jan. 24, 2008

(30) Foreign Application Priority Data

Jun. 23, 2006  (JP) ................. P2006-173752

(51) Int. Cl.
  *G06F 3/00* (2006.01)
(52) U.S. Cl. ........ 715/721; 715/716; 715/720; 715/722; 715/723
(58) Field of Classification Search .......... 715/825, 715/810, 719, 720–723; 386/46; 725/37, 725/44, 47
See application file for complete search history.

(56) References Cited

U.S. PATENT DOCUMENTS

| 2001/0007455 | A1* | 7/2001 | Yoo et al. ........... 345/856 |
| 2001/0052127 | A1* | 12/2001 | Seo et al. .......... 725/55 |
| 2002/0046215 | A1* | 4/2002 | Petrocelli .......... 707/200 |
| 2002/0110354 | A1 | 8/2002 | Ikeda et al. |
| 2002/0112226 | A1* | 8/2002 | Brodersen et al. ...... 717/140 |
| 2002/0135608 | A1 | 9/2002 | Hamada et al. |
| 2003/0068157 | A1* | 4/2003 | Kushibe et al. ........... 386/69 |
| 2003/0093790 | A1* | 5/2003 | Logan et al. ........... 725/38 |
| 2003/0235402 | A1 | 12/2003 | Seo et al. |
| 2004/0101279 | A1 | 5/2004 | Ikeda et al. |
| 2005/0094973 | A1* | 5/2005 | Kim et al. ............ 386/95 |
| 2005/0238321 | A1 | 10/2005 | Gohara et al. |
| 2006/0007801 | A1 | 1/2006 | Takashima |
| 2007/0033170 | A1* | 2/2007 | Sull et al. ............ 707/3 |
| 2007/0124789 | A1* | 5/2007 | Sachson et al. ........ 725/117 |

(Continued)

FOREIGN PATENT DOCUMENTS

EP         898279        2/1999

(Continued)

OTHER PUBLICATIONS

Blu-Ray Disc Founders: "White paper Blu-Ray Disc Format : 2.B Audio Visual Application format specifications for BD-ROM" Internet Citation, [Online] Mar. 2005, XP002315435 Retrieved from the Internet: URL: http://www.blu-raydisc.coni/assets/downloadablefi le/2b bdromaudiovisual applicati on-12841. pdf> [retrieved on Jan. 23, 2005] paragraphs [01.2], [0002], [03.5];figures 2.1-2.5,3.5 paragraph [0004]-paragraph [0005] figures 4.8-5.4.

(Continued)

*Primary Examiner* — Haoshian Shih
(74) *Attorney, Agent, or Firm* — Lerner, David, Littenberg, Krumholz & Mentlik, LLP

(57) ABSTRACT

An information processing apparatus may include a controller for controlling the reproducing of a menu based on content recorded on a information recording medium. The controller may control producing a menu that allows the content to be selected and reproduced by chapter, the chapter defined by a mark as content delimitation information set in play list information corresponding to the content recorded on the information recording medium and recording the menu on the information recording medium.

17 Claims, 14 Drawing Sheets

U.S. PATENT DOCUMENTS

2008/0092168 A1 * 4/2008 Logan et al. ............... 725/44

FOREIGN PATENT DOCUMENTS

| EP | 1052644 | 11/2000 |
| EP | 1198132 | 4/2002 |
| EP | 1531477 | 5/2005 |
| EP | 1538627 | 6/2005 |
| JP | 10-200843 A | 7/1998 |
| JP | 11-069284 A | 3/1999 |
| JP | 2004-318926 A | 11/2004 |
| JP | 2005-079823 A | 3/2005 |
| JP | 2005158151 A | 6/2005 |
| JP | 2005-303908 A | 10/2005 |
| WO | 2006061743 | 6/2006 |

OTHER PUBLICATIONS

[Online] Aug. 2004, XP007904846 Retrieved from the Internet: URL:http://www.blurayjukebox.com/html/blu•ray_whitepapers html> [retrieved on May 28, 2008] paragraph [3.1.5]-paragraph [3.1.6]; figures 3.1.5.1,3.1.5.4,3.1.5. .53.1.5.6.

Partial European Search Report, EP 07 01 2068.

Office Action from Japanese Application No. 2008-258050, dated Nov. 24, 2010.

* cited by examiner

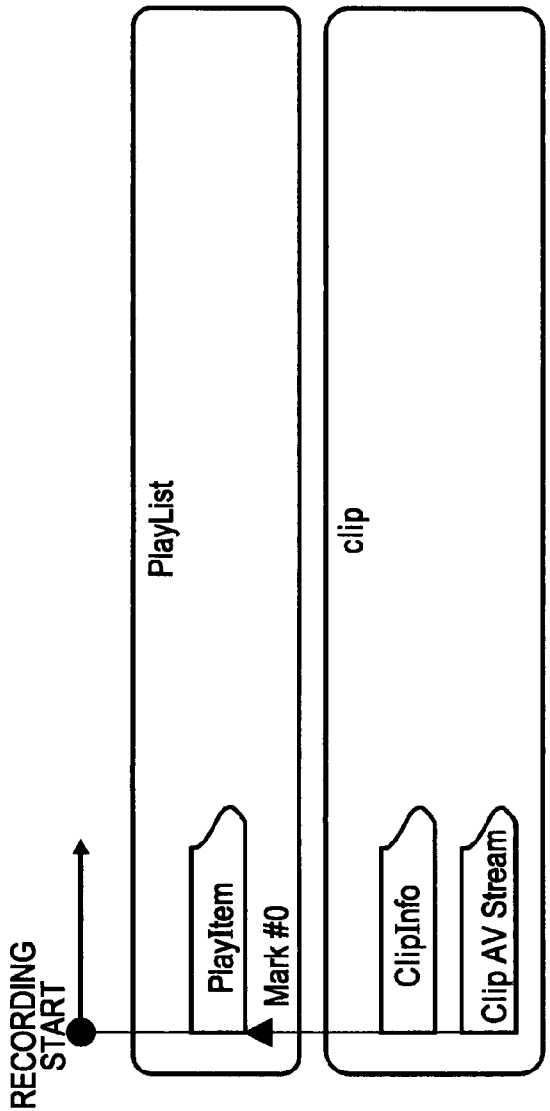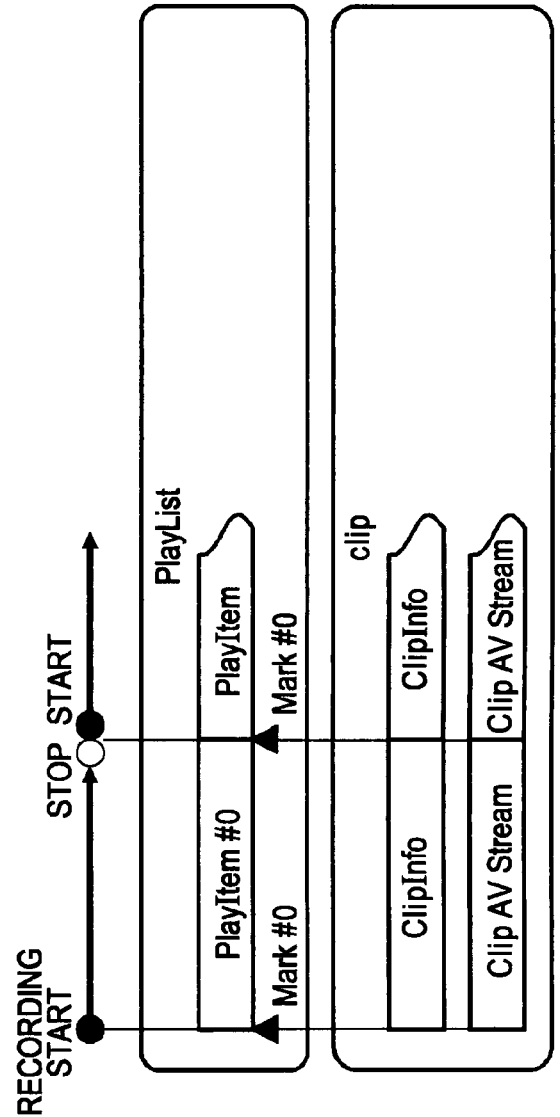

APPARATUS, METHOD, AND COMPUTER PROGRAM FOR PROCESSING INFORMATION

CROSS-REFERENCE TO RELATED APPLICATIONS

This application claims priority from Japanese Patent Application No. JP 2006-173752 filed in the Japanese Patent Office on Jun. 23, 2006, the entire content of which is incorporated herein by reference.

BACKGROUND OF THE INVENTION

1. Field of the Invention

The present invention relates to an information processing apparatus, an information processing method and a computer program and, more specifically, to an information processing apparatus, an information processing method and a computer program for producing a menu for content recorded on an information recording medium.

2. Description of the Related Art

As the recording capacity of disk-type recording media increases, video cameras storing moving images or still images on a disk instead of the known recording tape are commercially available. Since the disk-type recording medium is used in a random-access fashion, any desired scene can be efficiently found from recorded data. Since the disk-type recording medium operates in a non-contact fashion, data accessing to the disk is performed in a manner free from physical wear. For example, digital versatile disk (DVD) video cameras are in widespread use because of the user friendliness thereof such as high image quality and ease of editing.

One of processes of the information processing apparatus is to produce a menu for content recorded on the information recording medium. The menu lists a title and a representative image corresponding to the content recorded on the information recording medium to allow a user to select the content on a screen of a display.

The content is delimited by a predetermined reproducing unit and the title and the representative image for each reproducing unit are listed in the menu. A standard reproducing unit depends on a recording format of the content and is typically based on a play list set corresponding to the audio-visual stream.

The menu is thus arranged with one play list handled as one reproducing unit. When a reproducing process starts with the representative image and the title listed in the menu selected, content reproducing is performed based on a single play list. This arrangement is inconvenient for the content to be reproduced with a unit finer than the reproducing unit.

SUMMARY OF THE INVENTION

It may thus be desirable to provide an information processing apparatus, an information processing method and a computer program for producing a menu that allows the content to be reproduced in a unit finer than the reproducing unit.

In accordance with one embodiment of the present invention, an information processing apparatus may include a controller for controlling the producing of a menu based on content recorded on a information recording medium. The controller may produce a menu that allows the content to be selected and reproduced by chapter, the chapter defined by a mark as content delimitation information set in play list information corresponding to the content recorded on the information recording medium and records the menu on the information recording medium.

The controller may select a representative image by chapter and produce the menu that allows the representative image to be displayed in a list by chapter.

The controller may produce the menu that maps a command to be applied to reproduce the content from the start of the chapter to each representative image per chapter.

The controller may produce the menu that sets a command for reproducing the content from the start of the chapter mapped to each representative image by executing a navigation command applied to the content reproducing based on a specified representative image per chapter displayed on the menu.

The controller may produce the menu for reproducing the content from the start of the chapter mapped to each representative image by setting a register value setting command as a command corresponding to the representative image per chapter displayed on the menu, and executing a navigation command applied to the content reproducing in accordance with a register value.

The information processing apparatus may further include a storage unit storing resource information relating to a resource that is required to produce the menu based on the content recorded on the information recording medium. The controller may reference the resource information prior to the recording of new data onto the information recording medium or the editing of the content recorded on the information recording medium, and stops the recording of the new data or the editing of the content if the recording of the new data or the editing of the content can cause the resource to be lost.

The resource may include an attribute information storage file including a play list information file defined by a data recording format to the information recording medium.

The resource may include a storage capacity of the information recording medium storing information defined by the data recording format to the information recording medium.

The data recording format may include an AVCHD format.

In accordance with one embodiment of the present invention, an information processing method may include controlling the producing of a menu based on content recorded on a information recording medium. The controlling step may include producing a menu that allows the content to be selected and reproduced by chapter, the chapter defined by a mark as content delimitation information set in play list information corresponding to the content recorded on the information recording medium and recording the menu on the information recording medium.

The controlling step may include selecting a representative image by chapter and producing the menu that allows the representative image to be displayed in a list by chapter.

The controlling step may include producing the menu that maps, to each representative image per chapter, a command to be applied to the reproducing of the content from the start of the chapter.

The controlling step may include producing the menu that sets a command for reproducing the content from the start of the chapter mapped to each representative image by executing a navigation command applied to the content reproducing based on a specified representative image per chapter displayed on the menu.

The controlling step may include producing the menu for reproducing the content from the start of the chapter mapped to each representative image by setting a register value setting command as a command corresponding to the representative image per chapter displayed on the menu, and executing a navigation command applied to the content reproducing in accordance with a register value.

The information processing method may further include a step of storing resource information relating to a resource that is required to produce the menu based on the content recorded on the information recording medium, wherein the controlling step includes referencing the resource information prior to the recording of new data onto the information recording medium or the editing of the content recorded on the information recording medium, and stopping the recording of the new data or the editing of the content if the recording of the new data or the editing of the content can cause the resource to be lost.

The resource may include an attribute information storage file including a play list information file defined by a data recording format to the information recording medium.

The resource may include a storage capacity of the information recording medium storing information defined by the data recording format to the information recording medium.

The data recording format may include an AVCHD format.

In accordance with one embodiment of the present invention, a computer program is provided which may cause a computer to perform a step of controlling the producing of a menu based on content recorded on a information recording medium. The controlling step may include producing a menu that allows the content to be selected and reproduced by chapter, the chapter defined by a mark as content delimitation information set in play list information corresponding to the content recorded on the information recording medium and recording the menu on the information recording medium.

The computer program of one embodiment of the present invention may be supplied, to a computer system performing a variety of program code, in a computer readable format in a recording medium such as a compact disk (CD), a floppy disk (FD), and a magneto-optical (MO) disk, or via a communication medium such as a network. With the program provided in the computer readable format, the computer system may perform a process responsive to the computer program.

These and other features and advantages of the present invention will be apparent from the following description, and the accompanying drawings. The word "system" in the context of this specification may refer to a logical set of a plurality of apparatuses and may not be limited to a single casing containing a plurality of apparatuses.

In accordance with embodiments of the present invention, the information processing apparatus such as a video camera may perform a menu production process based on the content recorded on the information recording medium. The information processing apparatus may produce the menu that allows the content to be selected and reproduced by chapter, the chapter defined by the mark as content delimitation information set in the play list information corresponding to the content recorded on the information recording medium. The information processing apparatus may reproduce the content by chapter rather than by play list. Since the resources, such as an index, a movie object, and a play list, required to produce the menu in accordance with the AVCHD format, may be reserved, the information processing apparatus is free from a menu production error due to insufficient resource.

BRIEF DESCRIPTION OF THE DRAWINGS

FIGS. 7A and 7B illustrate a procedure in accordance with which the play list is generated together with the clip of an audio-visual (AV) stream in step with photographing and recording operations of a video camera in accordance with one embodiment of the present invention;

DETAILED DESCRIPTION

An information processing apparatus 100, an information processing method and a computer program in accordance with embodiments of the present invention are described below with reference to the drawings.

Figure 1:
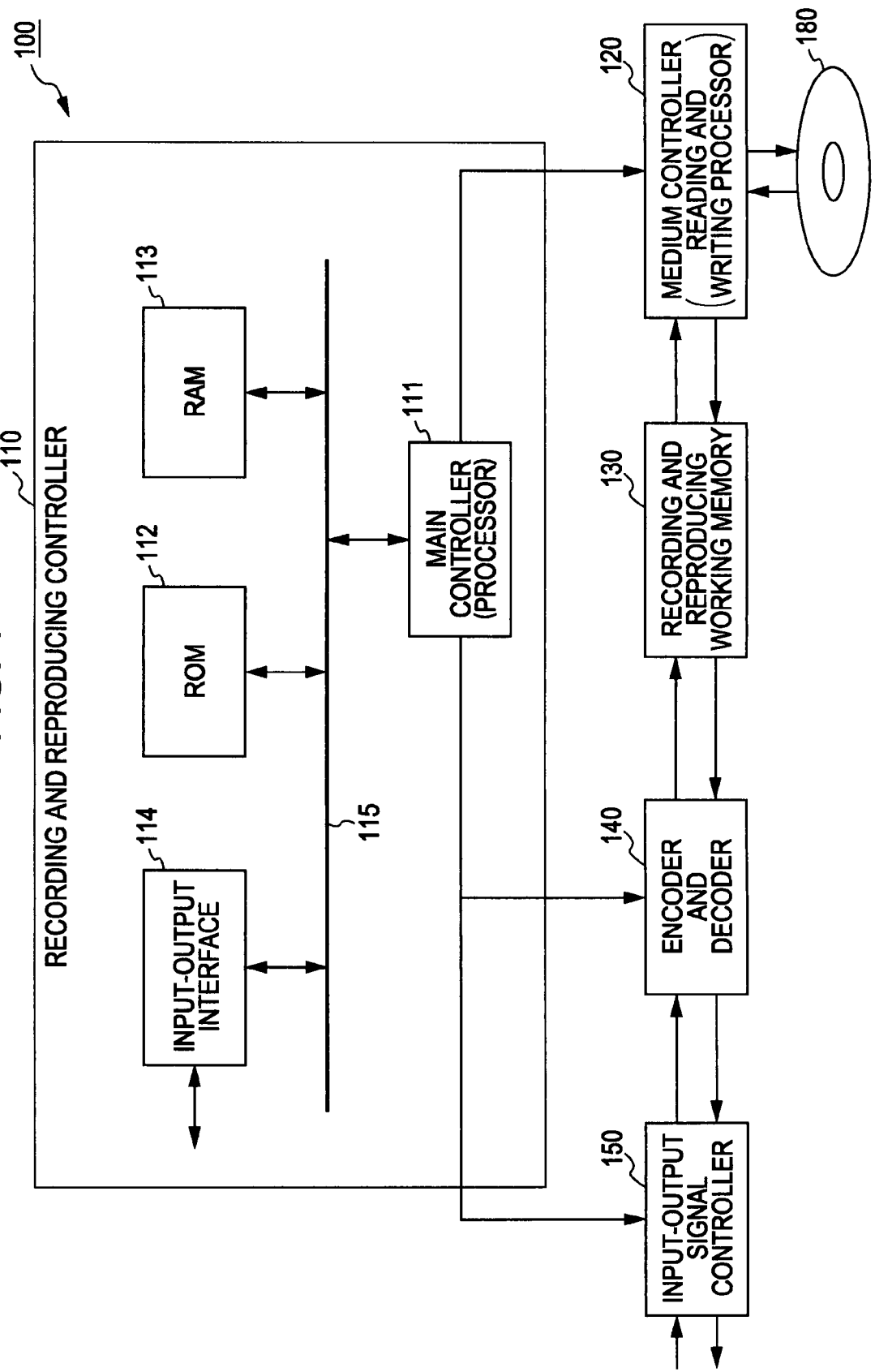
FIG. 1 is a block diagram illustrating an information processing apparatus in accordance with one embodiment of the present invention.

FIG. 1 is a block diagram illustrating the information processing apparatus 100 in accordance with one embodiment of the present invention. The information processing apparatus 100 of FIG. 1 is a video camera. As shown, the information processing apparatus 100 includes a recording and reproducing controller 110, a medium controller (reading and writing processor) 120, a recording and reproducing working memory 130, an encoder and decoder 140 and an input-output signal controller 150. The recording and reproducing controller 110 includes a main controller (processor) 111, a read-only memory (ROM) 112, a random-access memory (RAM) 113, and an input-output interface 114.

The information processing apparatus 100 is designed to record and reproduce a moving image and a still image using an information recording medium 180. The information processing apparatus 100 can generate a file in a moving image format such AVCHD format (MPEG-4 part 10 Advanced Video Coding (AVC)/H.264), namely, a photo movie based on the still image recorded on the information recording medium 180, and then re-record the photo movie onto the information recording medium 180. The data recording on the information recording medium 180 may be performed in accordance with the AVCHD format. The data recording in accordance with the AVCHD format will be described in detail later.

When data is recorded, the encoder and decoder 140 encodes the moving image or the still image input from the input-output signal controller 150. For example, the encoder and decoder 140 performs the encoding process on a video stream and an audio stream, composed of an input moving image signal, into a multiplexed data stream. The data encoded by the encoder and decoder 140 is stored on the recording and reproducing working memory 130 and then recorded onto the information recording medium 180 under the control of the medium controller 120.

The encoding operation performed by the encoder and decoder 140 during the data recording process becomes different between the moving image and the still image. The information recording medium 180 thus records thereon a moving image file and a still image file.

The information processing apparatus 100 reads still image data from the information recording medium 180, produces a file in a moving image format (such as MPEG) based on the read still image data, namely, the photo movie, and then re-records the photo movie onto the information recording medium 180. The photo movie production process is summarized below. The medium controller 120 reads the still image data from the information recording medium 180, and stores the read still image data on the recording and reproducing working memory 130. The encoder and decoder 140 decodes the still image signal. The decoded data is then re-input to the encoder and decoder 140 via the input-output signal controller 150. The encoder and decoder 140 generates the (MPEG) encoded data in the moving image format, namely, the photo movie in response to the input data. The generated photo movie is stored on the recording and reproducing working memory 130 and then re-recorded on the information recording medium 180 under the control of the medium controller 120.

The recording and reproducing controller 110 controls a data recording process, a data reproducing process, and a photo movie production process. The recording and reproducing controller 110 includes a main controller 111, a read-only memory (ROM) 112, a random-access memory (RAM) 113, an input-output interface 114 and a bus 115 used to interconnect these elements.

The main controller 111 issues to the encoder and decoder 140 a start command and a stop command to start and stop the encoding process, respectively. The main controller 111 also issues to the medium controller 120 a data read command and a data write command to read data from and write data to the medium controller 120, respectively. The main controller 111 controls a capturing operation of capturing an input signal from the encoder and decoder 140 and an output operation to output a captured input signal to the encoder and decoder 140. These operations are performed in a production process of the photo movie based on the still image data. More specifically, during the production process of the photo movie, the encoder and decoder 140 decodes the still image data recorded on the information recording medium 180, outputs the decoding process result to the input-output signal controller 150 and then inputs again the still image data from the input-output signal controller 150 to the encoder and decoder 140. The still image data is encoded into the data in the MPEG moving image format, namely, the photo movie.

The ROM 112 in the recording and reproducing controller 110 stores a program executed by the main controller 111 and a variety of parameters. The ROM 112 may include an electronically erasable and programmable read-only memory (EEPROM) such as a flash memory. The RAM 113 stores work data required for the main controller 111 to execute the program, and may include one of a static random-access memory (SRAM) and a dynamic random-access memory (DRAM). The input-output interface 114 is connected to a user input unit, a display, or a network and exchanges data and commands with an external device. The input-output interface 114 is used to update the program stored on the ROM 112, for example.

Figure 2:
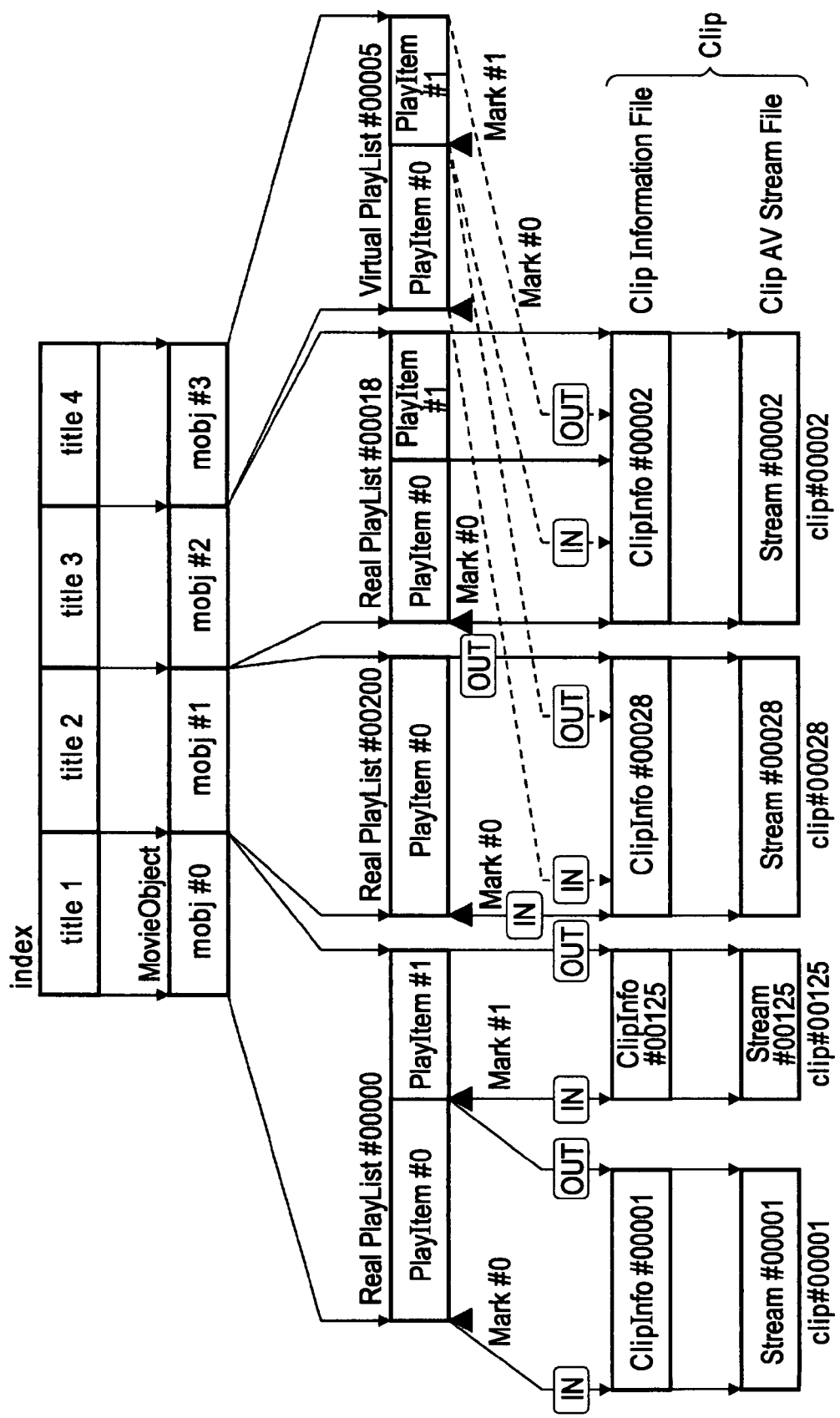
FIG. 2 illustrates a data structure of data recorded on an information recording medium in accordance with one embodiment of the present invention.

FIG. 2 illustrates a data structure of data stored on the information recording medium 180. The data structure to be discussed herein complies with the AVCHD format. As shown in FIG. 2, a moving image stream photographed by the video camera is encoded into an MPEG2-TS stream for recording. Generated and recorded in this case include an index file, a movie object (MovieObject) file, a play list (PlayList) file, a clip information (ClipInfomration) file, and a clip AV stream (ClipAVStream) file. Clip information files corresponding to the ClipAVStream of a predetermined data unit are collectively referred to as a clip.

The files are listed below and described in detail.

Index file: Maximum number of index files is one. Function of the index file is as follows: The index file is a root file used to manage the entire medium. The index file manages correspondence between a title shown to a user and a Movieobject file. In accordance with the AVCHD format, the play order of the play lists to be managed by the MovieObject is managed in metadata of the index file.

MovieObject file: Maximum number of MovieObject files is one. Function of the MovieObject file is as follows: the MovieObject file is used to manage the play list that is reproduced when a title is specified in accordance with the BD-ROM format. In accordance with the AVCHD format, the metadata in the index file is used to manage a relationship between the play list and the title without referencing the MovieObject file.

Real PlayList file: Maximum number of total of Real Playlist files and Virtual PlayList files are 2000. The function of the Real PlayList file is as follows: The Real PlayList is the PlayList for the original title. Video recorded and reproduced is registered in the real PlayList file in the order of recording.

Virtual PlayList file: The Virtual Playlist file is a PlayList for producing a user-defined play list through non-destructive editing. The Virtual PlayList has no clip thereof and reproduces data by specifying a clip registered in the Real PlayList file.

Clip Information: Maximum number of Clip Information files is 4000. The Clip Information file is present in pair with the ClipAVStream file, and contains information relating to a stream required for reproducing an actual stream.

Clip AV Stream file: Maximum number of Clip AV Stream files is 4000. The Clip AV Stream file contains a stream recorded in accordance with MPEG2-TS. Video data of AVC is contained in this file.

The index file manages the entire information recording medium 180 by file type layer. An index file is produced for each title shown to a user, and manages a correspondence relationship with the movie object. In accordance with the AVCHD format, the play order of the play lists to be originally managed by a movie object file is managed within the metadata of the index file. When the information recording medium is loaded on a player, the index file is first read. The user can see the title described in the index file.

The MovieObject file is used to manage the play list to be reproduced. A reference to a MovieObject file is listed in the index file as an entry point to the title. In accordance with the AVCHD format, the MovieObject file is not referenced and the relationship between the play list and the title is managed by the metadata in the index file.

The PlayList file is arranged in association with the title shown to the user and includes at least one PlayItem. Each PlayItem specifies a play period defined by a play start point (IN point) and a play end point (OUT point) of each clip. The play order of the play periods is specified by arranging a plurality of PlayItems in time axis in the PlayList. PlayItems referencing different clips may be contained in a single PlayList.

The reference relationship between the clip and the PlayList may be freely set. For example, a single clip may be referenced from two PlayLists different in the IN point and the OUT point. The reference relationship may be freely set between the title and the MovieObject. The PlayLists are divided into two major types, namely, a real PlayList and a virtual PlayList depending on the reference relationship with the clip.

The real PlayList is the one for the original title and has PlayItems of video streams, photographed and recorded by the video camera, in the order of recording.

The virtual PlayList is the one for producing a user-defined PlayList through non-destructive editing. The virtual PlayList has no clip (AV stream) thereof and the PlayItem in the virtual PlayList indicates a clip or a portion of the clip registered in any of the real PlayLists. More specifically, the user can extract a required play period from a plurality of clips and edit the PlayItems indicating the periods into a virtual PlayList.

The clipAVStream file stores a stream recorded in the MPEG-TS format on the information recording medium 180. The video data is stored in this file.

The clip information file is paired with the clipAVStream file and contains information relating to information required to reproduce an actual stream.

As described above, the index file, the MovieObject file, the PlayList file, the CipInformation file, and the clipAVStream file are recorded in accordance with the AVCHD format.

The designates of these files and data are described for exemplary purposes only, and other designates may be used. The content of each file and data are described below:

(1) AV stream (CipAVstream): Content data (2) Clip information (CipInformation): The clip information corresponds to the AV stream on a one-to-one correspondence basis, and defines an attribute of the corresponding AV stream. For example, the CipInformation file contains coding, size, time to address conversion, play management information, time map, etc.

(3) Play item (PlayItem): The play item contains data specifying a play period between a play start point and a play end point of the CipInformation.

(4) Play list (PlayList): The play list contains at least one PlayItem.

(5) Mark: A mark is typically present in the PlayList and indicates time point of play content. A period from one mark to a next mark is typically referred to as a chapter.

(6) Movie object (MovieObject): MovieObject is a set of commands for controlling playing.

(7) Title: Title is a set of PlayLists (recognizable by the user).

In the discussion that follows, data and files having the above-described content are the AV stream (clipAVStream), the clip information (ClipInformation), the play item (PlayItem), the play list (PlayList), the mark, the movie object (MovieObject), and the title. The present invention is applicable to the structure having substantially the same content as described above.

Figure 3:
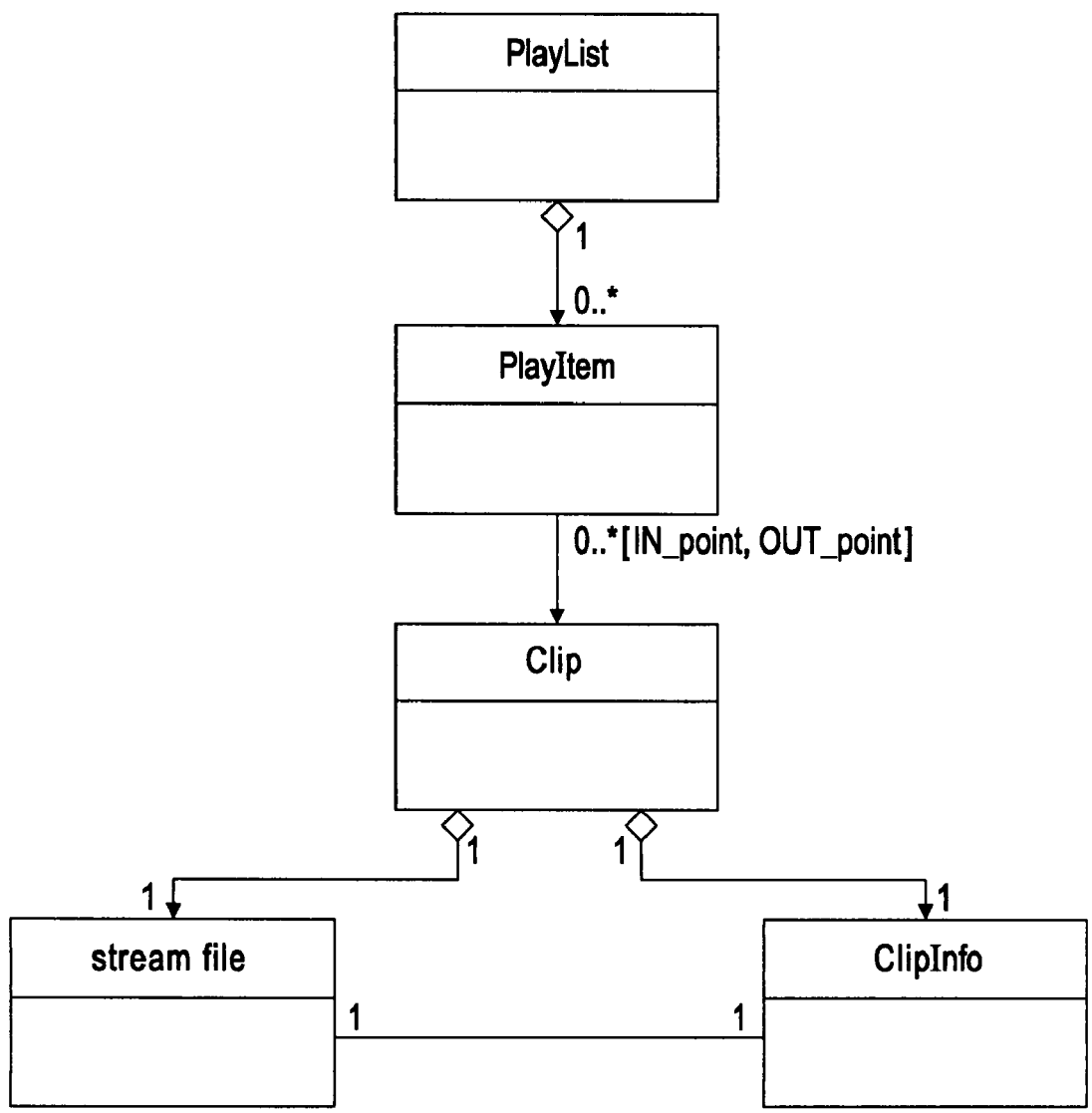
FIG. 3 illustrates a unified modeling language (UML) indicating a PlayList, PlayItem, Clip, ClipInformation, and ClipAVStrem in accordance with one embodiment of the present invention.

FIG. 3 illustrates a unified modeling language (UML) indicating the relationship of the PlayList, the PlayItem, the Clip, the CipInformation, and the clipAVStream discussed with reference to FIG. 2. The PlayList is related to at least one PlayItem, and one PlayItem is related to one clip. A plurality of PlayItems different in the start point and/or the end point may be related to a single clip. A single clipAVStream file can be referenced from a single clip. The clipAVStream file and the CipInformation file are related to each other on a one-to-one correspondence basis. By defining the structure in this way, a non-destructive play order may be specified with any portion of the data reproduced without modifying the clipAVStream file.

Figure 4:
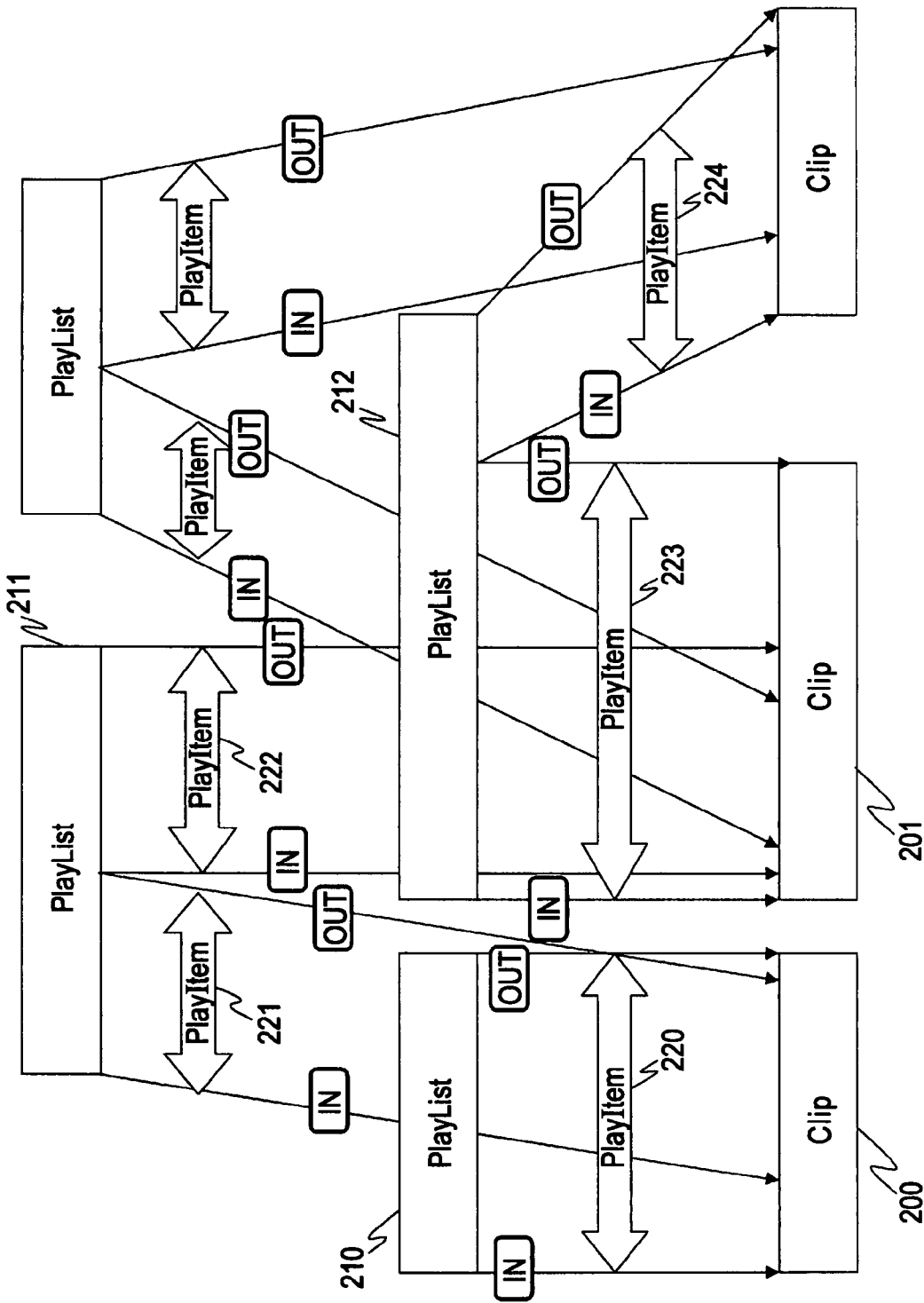
FIG. 4 illustrates a reference relationship of a play list to a clip in accordance with one embodiment of the present invention.

As shown in FIG. 4, the same clip may be referenced from a plurality of PlayLists. A single PlayList may specify a plurality of clips. The clip may be referenced by the IN point and the OUT point indicated by the PlayItem in the PlayList. As shown in FIG. 4, a clip 200 is referenced by a PlayItem 220 in a PlayList 210 while a period defined by the IN point and the OUT point of a PlayItem 221, out of the PlayItems 221 and 222 forming a PlayList 211 is referenced. In a clip 201, a period thereof defined by the IN point and the OUT point of the PlayItem 222 in the PlayList 211 is referenced, and a period thereof defined by the IN point and the OUT point of a PlayItem 223, out of PlayItems 223 and 224 in a PlayList 212 is referenced.

Figure 5:
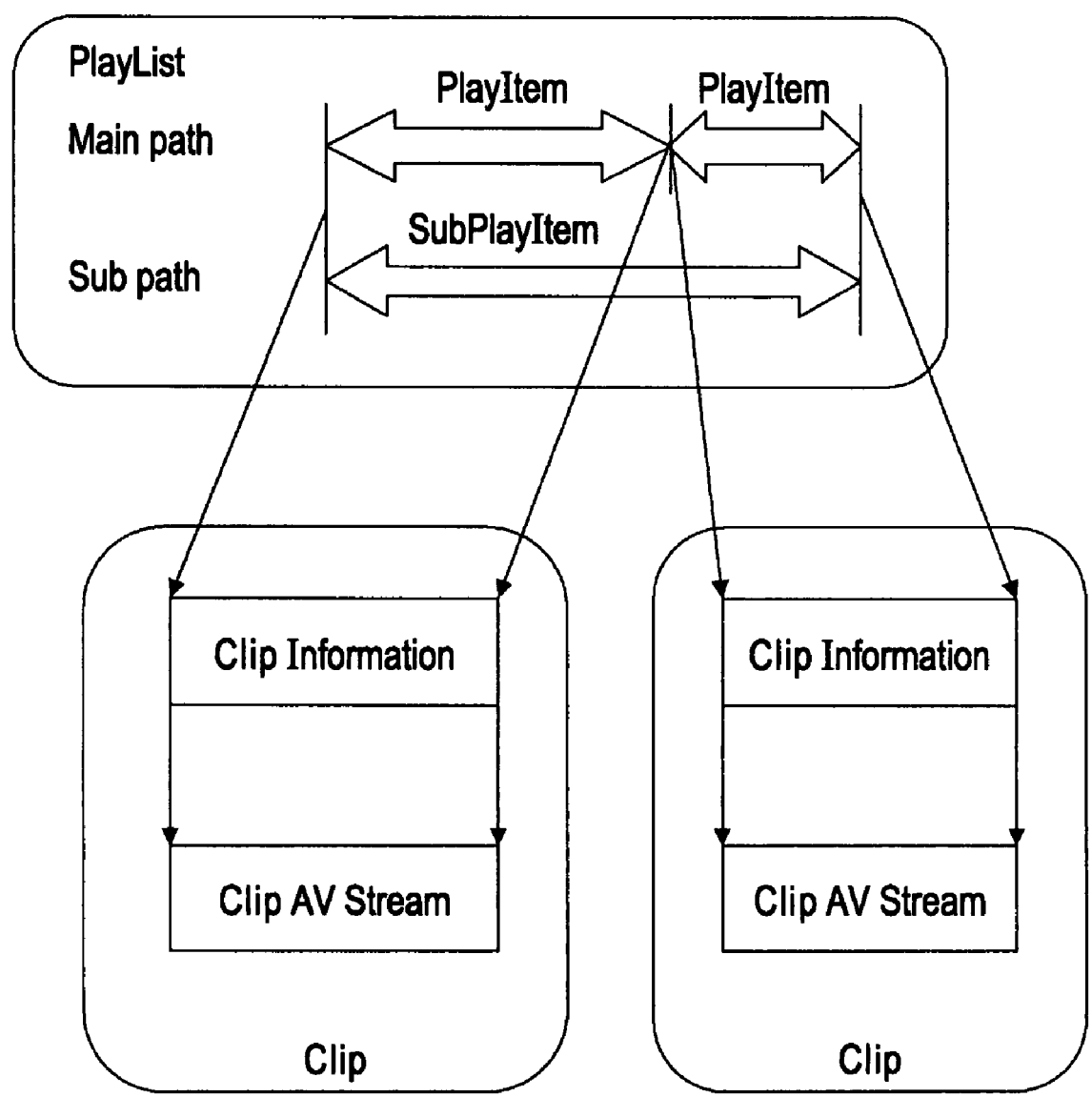
FIG. 5 illustrates a relationship of a main path and a sub path set in the play list, and the clip in accordance with one embodiment of the present invention.

As shown in FIG. 5, the PlayList may have a sub path corresponding to a sub PlayItem in a way similar to the relationship between the main path and the PlayItem to be mainly reproduced. For example, an after-recording PlayItem attached to the PlayList may be contained as a sub PlayItem in the PlayList. As will be described in detail later, the PlayList can contain a sub PlayItem only when a predetermined condition is satisfied.

Figure 6:
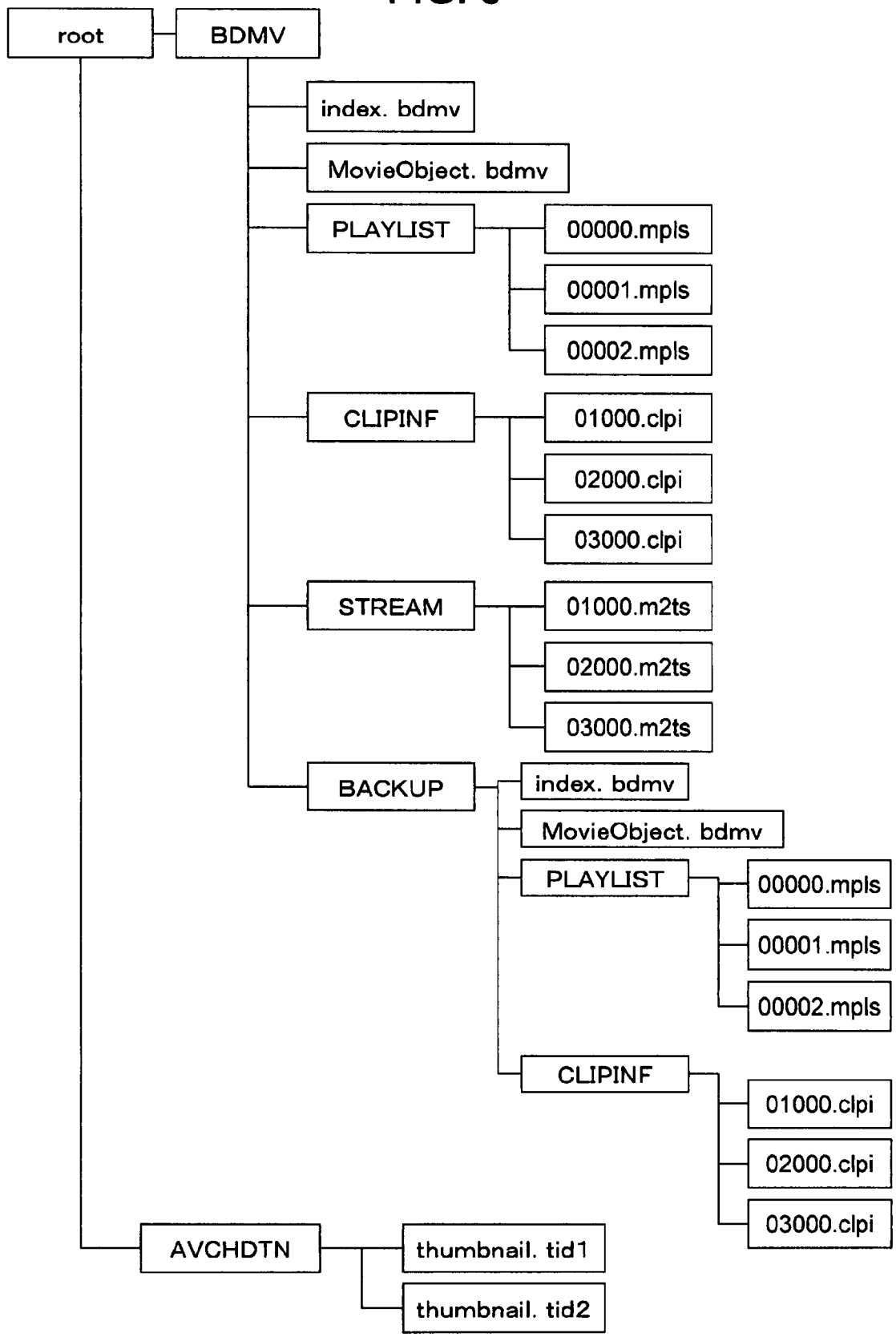
FIG. 6 illustrates a management structure of files recorded on the information recording medium in accordance with one embodiment of the present invention.
Figures 8A, 8B:
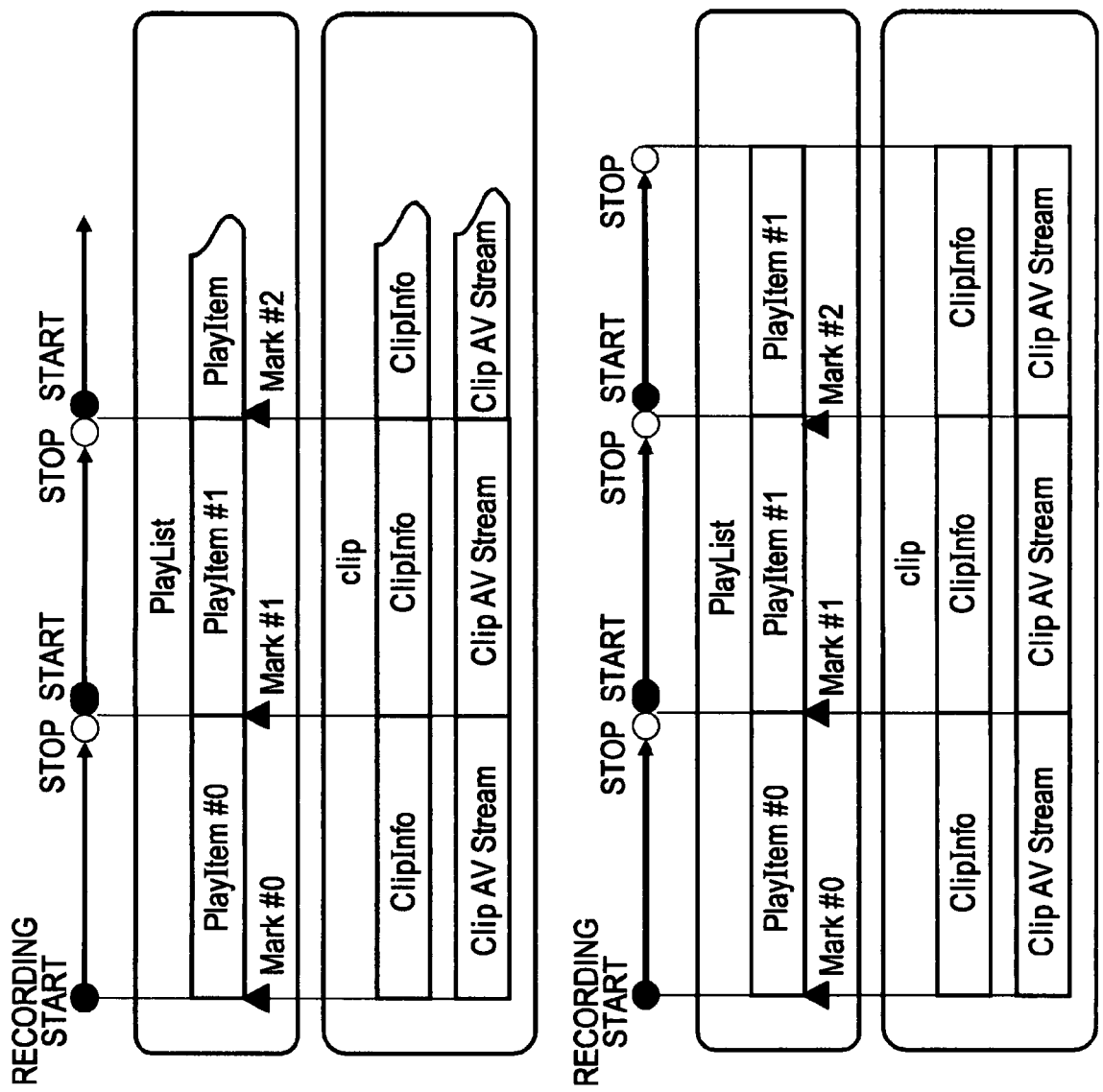
FIGS. 8A and 8B illustrate a procedure in accordance with which the play list is generated together with the clip of an AV stream in step with photographing and recording operations of the video camera in accordance with one embodiment of the present invention.

A management structure of a file to be recorded on the information recording medium 180 is described below with reference to FIG. 6. As described above with reference to FIGS. 2 through 4, the data to be recorded on the information recording medium 180 includes the MovieObject, the PlayList, and the clip. The clip includes the CipInformation file and clipAVStream file. The files are managed by layer. One directory (a root directory in FIG. 6) is created on the information recording medium 180. The directories under the root directory are a range controlled by a single recording and reproducing system.

Arranged under the root directory are a BDMV directory and an AVCHDTN directory. A thumbnail file having a representative image of a clip contracted to a predetermined size is arranged under the AVCHDTN directory. The data structure discussed with reference to FIG. 2 is stored under the BDMV directory.

Only two files, namely, an index.bdmv file and a Movieobject.bdmv file, can be arranged under the BDMV directory. The directories arranged under the BDMV directory are a PLAYLIST directory, a CLIPINF directory, a STREAM directory, and a BACKUP directory.

The content of the BDMV directory is described in the index.bdmv file. The MovieObject.bdmv file stores information regarding at least one movie object.

The PLAYLIST directory contains a database of the PlayList. More specifically, the PLAYLIST directory contains a play list file xxxxx.mpls as a file relating to a movie play list.

The play list file xxxxx.mpls is created for each of the movie play lists. In the file name, "xxxxx" preceding the period (".") is a five digit number, and "mpls" following the period is an extension fixed to this type of file.

The CLIPINF directory contains a database of each clip. More specifically, the CLIPINF directory contains a clip information file "zzzzz.clpi" corresponding to each clipAVStream file. In the file name, "zzzzz" preceding the period (".") is a five digit number, and "clpi" following the period is an extension fixed to this type of file.

The STREAM directory contains an AV stream file as a body. More specifically, the STREAM directory contains a clip AV stream file corresponding to each clip information file. The clip AV stream file contains a moving picture experts group (MPEG) 2 transport stream (hereinafter referred to as MPEG2 TS), and has a file name "zzzzz.m2ts." In the file name, "zzzzz" preceding the period is identical to that of the corresponding clip information file to allow the correspondence between the clip information file and the clip AV stream file to be easily recognized.

The BACKUP directory contains backup data corresponding to the index.bdmv file, the Movieobject.bdmv file, the PLAYLIST directory, and the CLIPINF directory.

The AVCHDTN directory can contain two types of thumbnail files, namely, a thumbnail.tid1 file and a thumbnail.tid2 file. The thumbnail.tid1 file contains a thumbnail image encoded in accordance with a predetermined method. The thumbnail.tid2 file contains an unencoded thumbnail image. For example, a thumbnail image corresponding to a clip the user has photographed with a video camera is copy free and needs no encoding, and is thus contained in the thumbnail.tid2 file.

A generation process of generating the PlayList together with the AV stream in step with the photographing and recording of the video by the video camera is described below with reference to FIGS. 7A and 7B and FIGS. 8A and 8B.

FIGS. 7A and 7B and FIGS. 8A and 8B illustrate the generation process of the clip and the play list performed when the user starts and stops a recording process. As shown in FIGS. 7A and 7B and FIGS. 8A and 8B, one PlayItem is generated in a period from when the user starts the recording process to when the user stops the recording process. One clip AV stream file is generated in accordance with one session of the photographing and recording operation. Along with this session, the clip information file is also generated. One clip is a unit requiring reproduction under which continuous synchronized playing, namely, real-time play is guaranteed.

Each time the user starts recording, an entry mark is attached to the head of the PlayItem. The entry mark in the PlayList is referred to as a PlayList mark (PLM). Within one PlayList, PlayItems and the marks are serially numbered. Although the head of each PlayList for a moving image must be tagged with the respective entry mark, a predetermined operation can shift the entry mark in time axis.

Each entry mark represents an entry position at which the user has accessed the stream. Periods, each period delimited by adjacent entry marks (and a period from last mark to the end of the final PlayItem) are "chapters" as a minimum editing unit viewed from the user. The play order of the PlayLists is defined by arranging both the PlayItems and the entry marks in the play order.

A menu production process is described below. The menu is displayed on an opening screen at the setting or startup of the information recording medium 180. The menu lists a title and a representative image of each content file of moving images stored on the information recording medium 180.

In the menu production process, the information processing apparatus of one embodiment of the present invention produces the menu that allows the chapter to be specified as a reproducing unit in reproducing the content. As previously discussed, the menu listing the title and the representative image corresponding to the content recorded on the information recording medium 180 is displayed so that the user can selects the content to be reproduced on the screen of display. The reproducing unit of the content is determined, and the produced menu lists display data containing the title and the representative image corresponding to the reproducing unit. A standard reproducing unit depends on a recording format of the content and is typically based on a play list set corresponding to the AV stream. The menu is thus arranged with one play list handled as one reproducing unit. When a reproducing process starts with the representative image and the title listed in the menu selected, content reproducing is performed based on a single play list. This arrangement is inconvenient for the content to be reproduced with a unit finer than the reproducing unit.

The information processing apparatus generates the menu that performs the reproducing process by chapter rather than by play list. The chapter refers to a content period delimited by marks recorded in the PlayList and is a minimum unit shown to the user.

The menu production process is performed in response to a menu production command issued by the user. The menu production process is typically performed in the finalize process. With the information recording medium 180 stopped in the configuration shown in FIG. 1, the finalize process is performed to inhibit the new data recording on the information recording medium 180.

Figure 9:
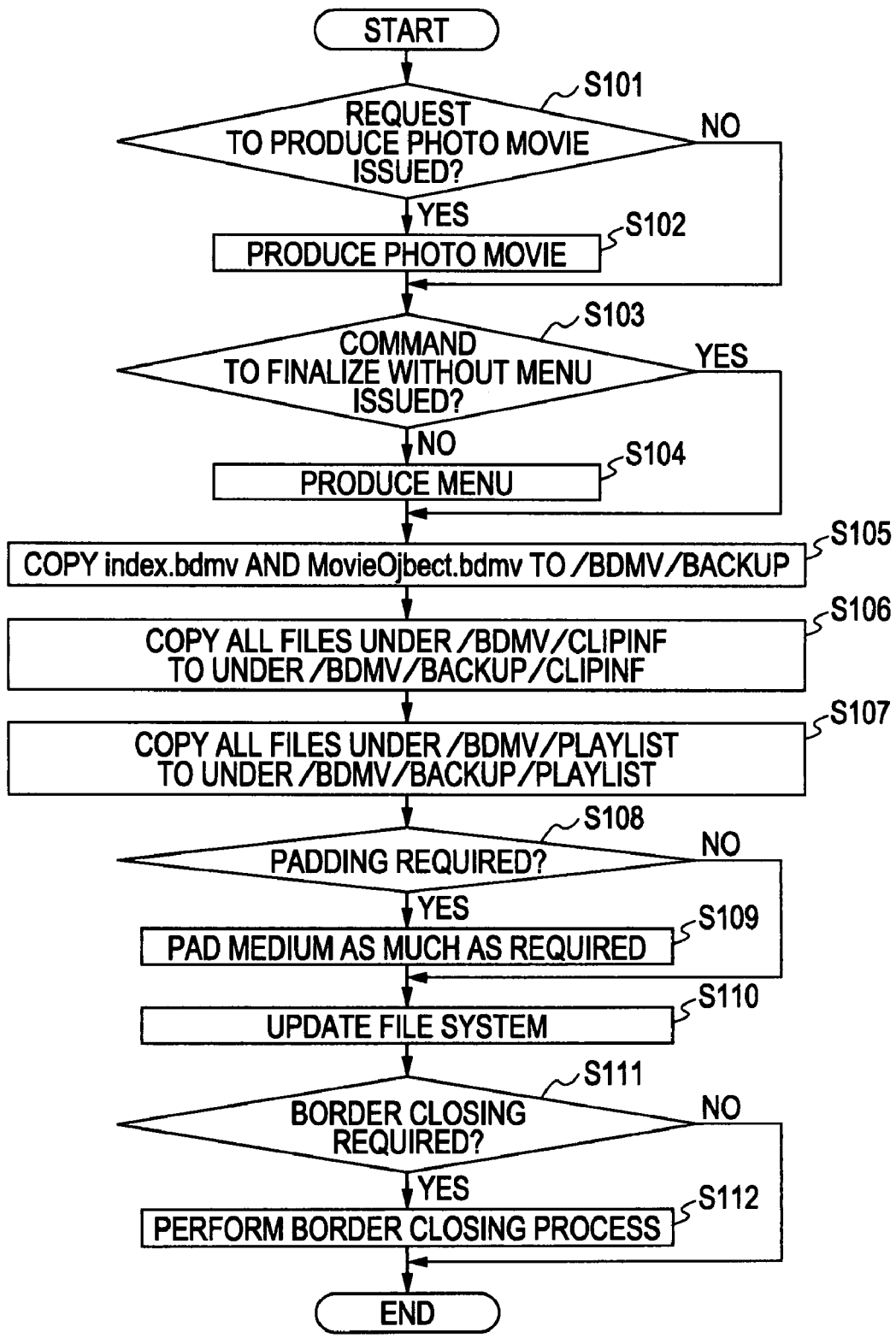
FIG. 9 is a flowchart illustrating a sequence of a finalize process in accordance with one embodiment of the present invention.
Figure 10:
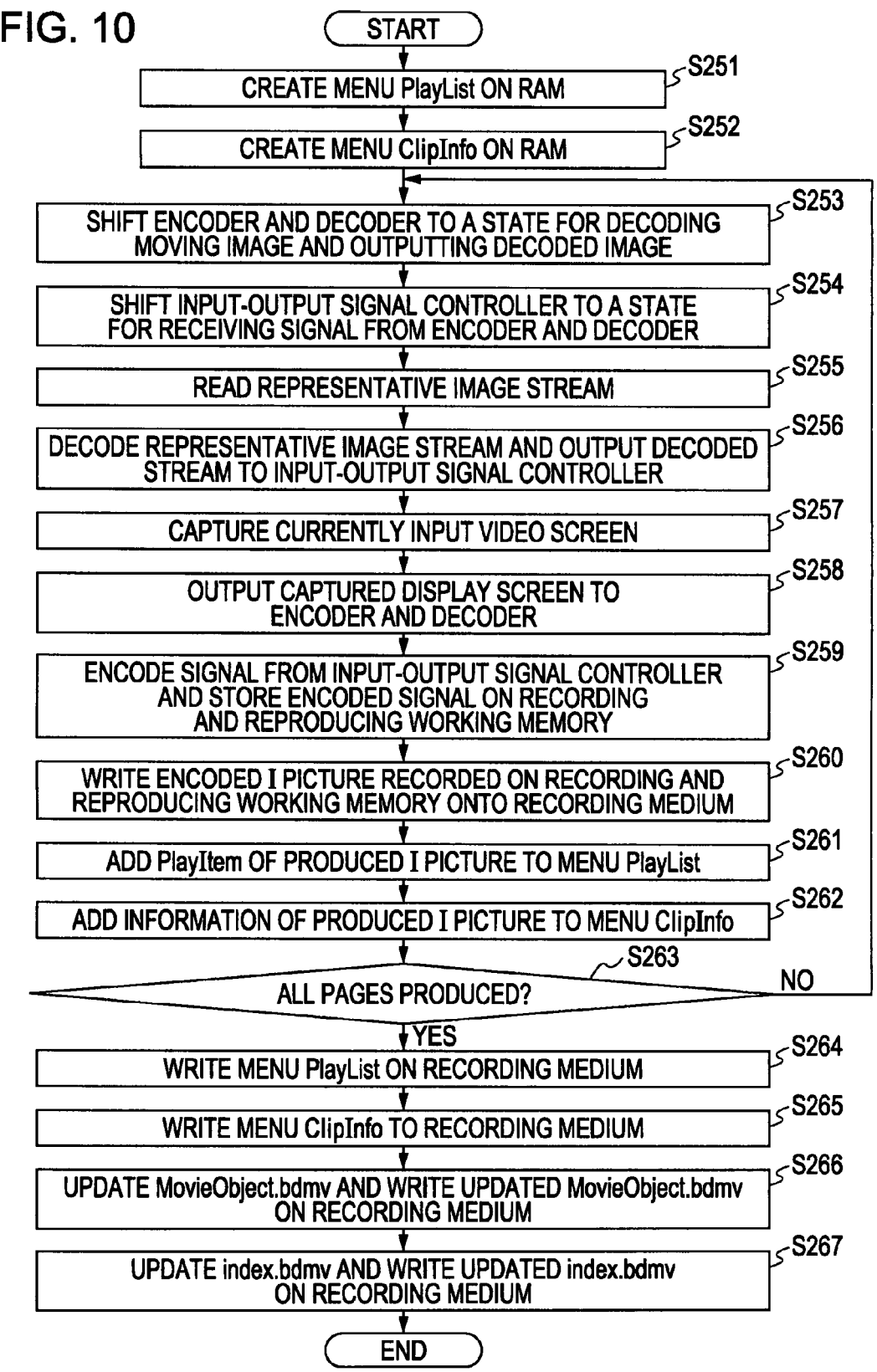
FIG. 10 is a flowchart illustrating a menu production process sequence in accordance with one embodiment of the present invention.

For example, when a finalize process start request is issued by the user via the input-output interface 114 of FIG. 1, the finalize process is started under the control of the recording and reproducing controller 110. Even if the finalize process is performed, a finalize canceling process can restore an additional storage enabled state on the information recording medium 180. The menu production sequence in the finalize process is described below. FIG. 9 is a flowchart illustrating the finalize process and FIG. 10 is a flowchart illustrating the menu production process. The menu production process of FIG. 10 corresponds to step S104 of FIG. 9. The menu production is performed in the finalize process. The menu production may also be performed in response to a user request.

The finalize process is described below with reference to the flowchart of FIG. 9. In step S101, the main controller 111 determines whether a photo movie production request has been input. For example, the main controller 111 controls a display via the input-output interface 114 to display a message urging the user to input the user's decision and then determines the presence or absence of the photo movie production request. The photo movie is produced by reading the still image data from the information recording medium 180 and encoding the read still image data into a moving image (MPEG) file. The moving image file is then recorded on the information recording medium 180. This process is performed when the main controller 111 causes the display to display the message to the user to decide whether to produce the photo movie and then determines whether to produce the photo movie in response to the user response.

If it is determined in step S101 that the production of the photo movie is required, the main controller 111 produces the photo movie in step S102. In step S103, the main controller 111 determines whether the request to perform the finalize process without menu has been issued. During the finalize process, the user can determine whether to perform the finalize process with or without menu.

If it is determined in step S103 that the finalize process without menu is not requested, processing proceeds to step S104 to perform the menu production process. The backup data is recorded in next steps S105 through S107. First in step S105, the index.bdmv file and the MovieObject.bdmv file in the directory structure previously discussed with reference to FIG. 6 are copied to a index.bdmv file and a MovieObject.bdmv file in the BACKUP directory set as a recording directory of the backup data.

In step S106, the clip information file recorded on the CLIPINF directory is recorded as the backup data in the CLIPINF directory in the BACKUP directory. In step S107, the play list information recorded in the PLAYLIST directory is recorded as the backup data in the PLAYLIST directory in the BACKUP directory.

In step S108, the main controller 111 determines whether to perform a padding process. The padding process is performed to write dummy data onto a data unrecorded area of the information recording medium 180 such as a disk. Depending on design, some apparatuses for playing a disk cannot reproduce data if a remaining data recording area of the disk becomes small. To avoid such a problem, the padding process is performed to write the dummy data onto the data unrecorded area of the disk. The status of the recording area of the information recording medium 180 is detected, and if a data unrecorded area is large, the main controller 111 determines that the padding process needs to be performed. In step S109, the padding process is performed.

In step S110, the file system is updated. The update process of the file system is performed to update management information in response to data recorded on the information recording medium 180. In step S111, the main controller 111 determines whether a border closing process is required or not. The border closing process is performed on the information recording medium 180 to make recognizable lead-in and lead-out points indicating a data recording area on the disk. Whether to perform the border closing process is determined based on the type of each information recording medium 180. If it is determined that the border closing process is required, the border closing process is performed in step S112.

In this way, the finalize process is performed. Through the finalize process, the additional storage to the information recording medium is inhibited. As previously discussed, even if the finalize process is performed, the finalize canceling operation can be performed to cancel the finalized state. The finalize canceling operation can restore the information recording medium 180 to an additional storage enabled state.

The menu production process is described below in detail. The menu production process may be performed in the finalize process or at a different timing of the finalize process, for example, in response to a user request during data editing. When the user inputs a menu production request via the input-output interface 114 of FIG. 1, the menu production process is started under the control of the recording and reproducing controller 110.

The menu production process is described below with reference to a flowchart of FIG. 10. The information processing apparatus of one embodiment of the present invention reserves a resource for the photo movie production so that the photo movie production may be performed on the still image recorded on the information recording medium without insufficient resource. The resources to be preserved for the photo movie production are listed in the following table.

TABLE

| Resources | Number of preserved resources | Maximum value |
|---|---|---|
| File size of index.bdmv [Bytes] | XX (TBD) | 100 × 1024 |
| Number of objects in MovieObject.bdmv (number_of_mobjs) | 1 | 1001 |
| File size of MovieObject.bdmv [Bytes] | XX (TBD) | 600 × 1024 |
| Number of PlayLists on medium | 1 | 2000 |
| Number of clip information files on medium | 1 | 4000 |
| Remaining recording capacity on medium [Bytes] | Number of still images by I Picture size | Depending on medium |

As listed in the above Table, the resources reserved to allow the photo movie to be produced include the file size of the index.bdmv file, the number of objects in the MovieObject.bdmv file, the number of PlayList files on the information recording medium, the file size of the Movieobject.bdmv file, the number of clip information files, and the remaining recording capacity on the information recording medium. The resource reservation process is performed under the control of the main controller 111 in the recording and reproducing controller 110 of FIG. 1. For example, information relating to the resources to be reserved listed in the above table is stored on the ROM 112. The main controller 111 references the resource information during the new data recording process or the data edition process. Upon determining that a resource to be reserved can be lost by one of the new data recording process and the data editing process, the main controller 111 stops the process and displays a warning message.

The menu production process is described below with reference to a flowchart of FIG. 10. In step S251, the PlayList for the menu is produced on the RAM 113. The PlayList is discussed with reference to the data format illustrated in FIG. 2 and corresponds to the content as the AV stream. The PlayList corresponding to the menu is generated on the RAM 113.

In step S252, the clip information for the menu is produced on the RAM 113. As previously discussed, the clip information is a file defining the attribute of the AV stream. The clip information as an attribute defining file corresponding to the menu is produced on the RAM 113.

In step S253, the recording and reproducing controller 110 shifts the encoder and decoder 140 of FIG. 1 to a state to be ready to decode the still image and output outward the decoded still image. In step S254, the recording and reproducing controller 110 shifts the input-output signal controller 150 to a state to be ready to receive the signal from the encoder and decoder 140. In step S255, the recording and reproducing controller 110 reads a stream of a representative image, such as leading image data of each chapter, recorded on the information recording medium 180 via the medium controller 120.

In step S256, the recording and reproducing controller 110 decodes the representative image stream, read from the information recording medium 180, with the encoder and decoder 140, and then outputs the decoded representative image stream to the input-output signal controller 150. Steps S255 and S256 are repeated by the number of times equal to the number of chapters on each page. In other words, a representative image is selected on a per chapter basis and displayed on the menu. The menu thus allows each chapter to be selectable as a reproducing unit. As previously discussed, the chapter is a content reproducing period delimited by marks set in the PlayList. The correspondence between display data on the menu and the play content will be described later.

The input-output signal controller 150 captures the input still image in step S257 and outputs the captured still image to the encoder and decoder 140 in step S258.

In step S259, the encoder and decoder 140 produces a stream corresponding to the menu by performing the encoding process to encode the representative image input from the input-output signal controller 150 into encoded data in a moving image format (such as MPEG format), and then stores the produced stream onto the recording and reproducing working memory 130.

In step S260, the medium controller 120 records on the information recording medium 180 an I picture from the encoded data recorded on the recording and reproducing working memory 130. The I pictures are components of the I picture, a P picture, and a B picture, forming MPEG data, and thus important pictures in the MPEG encoded data.

In step S261, the recording and reproducing controller 110 adds to the PlayList for the menu the PlayItems corresponding to the number of I pictures generated in the encoding process. More specifically, in the PlayList of the menu, a PlayItem is set for each I picture forming the menu.

In step S262, the information regarding each I picture produced in the encoding process is added to the clip information for the menu. The clip information is a file defining the attribute of the AV stream. For example, the clip information contains coding, size, time to address conversion, play management information, time map, etc. These pieces of information are produced for each I picture and recorded in the clip information.

In step S263, the recording and reproducing controller 110 determines whether the menu production process has been completed on all pages forming the menu. If it is determined in step S263 that the menu production process has not been completed, processing returns to step S253 to perform step S253 and subsequent steps on unprocessed data. If it is determined in step S263 that the menu production process has been completed on all pages, processing proceeds to step S264. The menu PlayList produced on the RAM 113 is recorded on the information recording medium 180.

In step S265, the menu clip information produced on the RAM 113 is written onto the information recording medium 180. In step S266, an update process is performed to record information corresponding to the produced menu in the movie object file. The movie object file is a set of commands for performing play control. The update process is thus performed to record a command responsive to a newly produced menu in the movie object on the information recording medium 180. In step S267, in the index file, information responsive to the menu is updated and written on the information recording medium 180.

The menu is thus produced, and then recorded onto the information recording medium 180.

Figure 11:
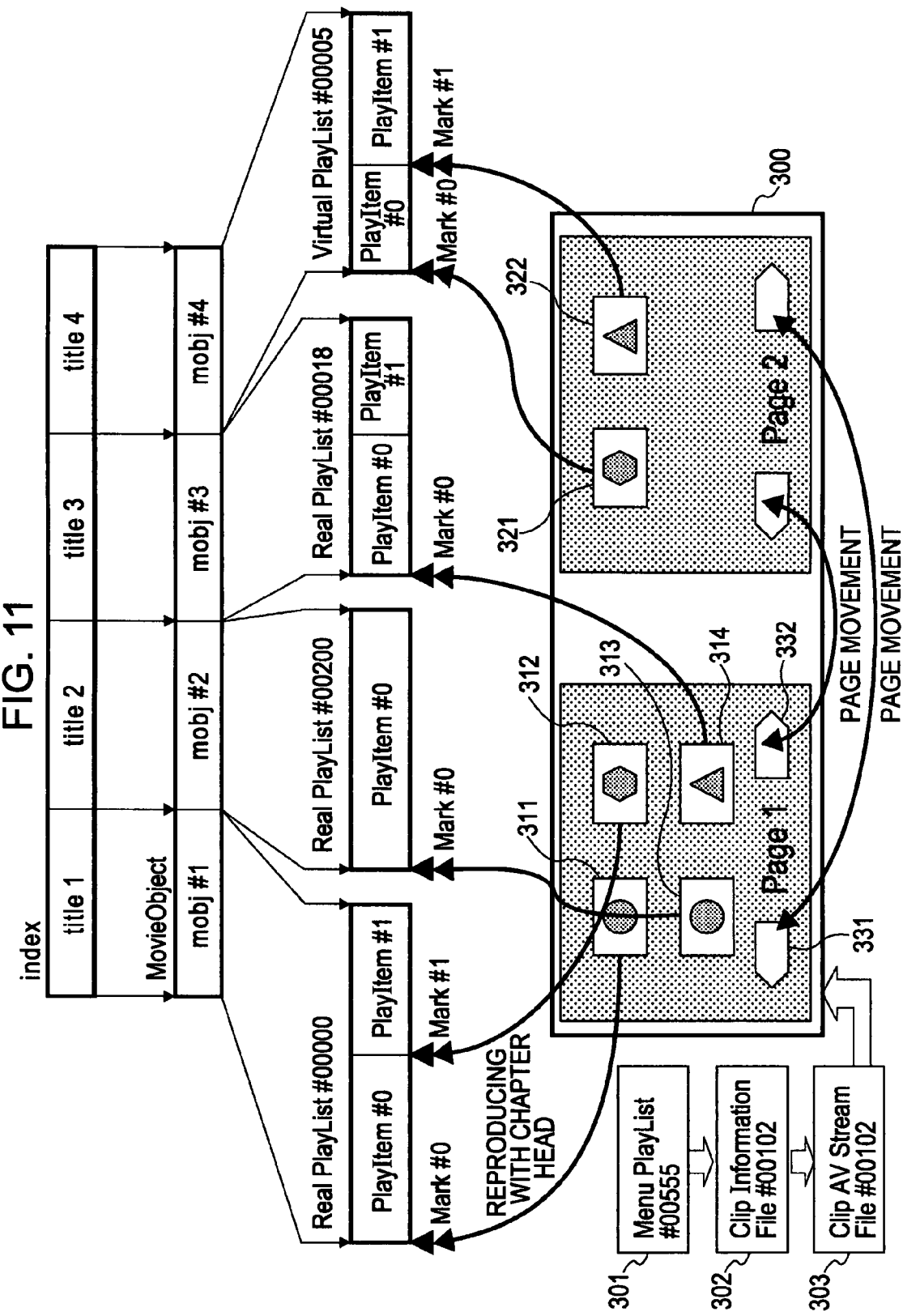
FIG. 11 illustrates a link mechanism of menu in accordance with one embodiment of the present invention.

The correspondence between a link structure of the menu and a navigation command is described below with reference to FIG. 11 and subsequent figures. FIG. 11 illustrates a menu screen 300. A plurality of pages displayed as a menu, namely, two consecutive pages are shown for explanation. In practice, one page is displayed at one time. The pages are switched by selecting one of page turning icons 331 and 332.

The menu screen 300 is displayed on the display of the reproducing apparatus when an information recording medium having the content and the produced menu recorded thereon is loaded onto the reproducing apparatus. As previously discussed with reference the flowchart of FIG. 10, the display data corresponding to the menu is AV stream data specified by the PlayList corresponding to the menu. As shown in FIG. 11, a menu PlayList "#00555" 301 calls and displays a clip information file "#00102" 302 and a clip AV stream file "#00102" 303, each corresponding to the menu.

The display menu allows the chapter to be selected as a reproducing unit. Representative images (thumbnail images) 311-314 and 321 and 322 corresponding to the chapters are displayed. When the user specifies one of the representative images 311-314 and 321 and 322, a mark of a PlayList linked to the representative image is identified. Content reproducing starts with the mark position of the PlayList as a link destination.

For example, when the user selects the representative image 311 on page 1 with a link set to a front-end position mark "Mark#0" of a PlayItem "#0" of a real PlayList "#00000," information regarding the representative image 311 is input to the main controller 111 of the reproducing apparatus. Based on the link information, the main controller 111 identifies the mark "Mark#0" of the PlayItem "#0" in the PlayList "#00000," acquires the AV stream at the play list position specified by the mark "Mark#0," and starts the reproducing process.

In the representative image 312 on page 1, a link is set to a front end position mark "Mark#1" of a PlayItem "#1" of the same real PlayList "#00000" as the representative image 311. When the user selects the representative image 312, information regarding the representative image 312 is input to the main controller 111 of the reproducing apparatus. Based on the link information, the main controller 111 identifies the mark "Mark#1" of the PlayItem "#1" in the PlayList "#00000," acquires the AV stream at the play list position specified by the mark "Mark#1," and starts the reproducing process.

The content between the mark "Mark#0" and the mark "Mark#1" of the real PlayList "#00000" is one chapter, and the content from the mark "Mark#1" of the real PlayList "#00000" to the end of the real PlayList "#00000" is also one chapter. By selecting the representative image on the menu, content reproducing can be performed by chapter.

In the representative image 313 on page 1, a link is set to a front end position mark "Mark#0" of a PlayItem "#0" of a real PlayList "#00200". When the user selects the representative image 313, information regarding the representative image 313 is input to the main controller 111 of the reproducing apparatus. Based on the link information, the main controller 111 identifies the mark "Mark#0" of the PlayItem "#0" in the PlayList "#00200," acquires the AV stream at the play list position specified by the mark "Mark#0," and starts the reproducing process.

In the representative image 314 on page 1, a link is set to a front end position mark "Mark#0" of a PlayItem "#0" of a real PlayList "#00018". When the user selects the representative image 314, information regarding the representative image 314 is input to the main controller 111 of the reproducing apparatus. Based on the link information, the main controller 111 identifies the mark "Mark#0" of the PlayItem "#0" in the PlayList "#00018," acquires the AV stream at the play list position specified by the mark "Mark#0," and starts the reproducing process.

In the representative image 321 on page 2, a link is set to a front end position mark "Mark#0" of a PlayItem "#0" of a virtual PlayList "#00005". When the user selects the representative image 321, information regarding the representative image 321 is input to the main controller 111 of the reproducing apparatus. Based on the link information, the main controller 111 identifies the mark "Mark#0" of the PlayItem "#0" in the PlayList "#00005," acquires the AV stream at the play list position specified by the mark "Mark#0," and starts the reproducing process.

In the representative image 322 on page 2, a link is set to a front end position mark "Mark#1" of a PlayItem "#1" of the virtual PlayList "#00005". When the user selects the representative image 322, information regarding the representative image 322 is input to the main controller 111 of the reproducing apparatus. Based on the link information, the main controller 111 identifies the mark "Mark#1" of the PlayItem "#1" in the PlayList "#00005," acquires the AV stream at the play list position specified by the mark "Mark#1," and starts the reproducing process.

In the menu produced by the information processing apparatus of one embodiment of the present invention, the representative images are displayed by chapter, and each representative image contains the link information to the mark position at the chapter front end. Content reproducing is thus performed by chapter.

The reproducing process performed by specifying the representative image displayed on the menu, namely, the reproducing process using the navigation command of the movie object is described below with reference to FIG. 12.

The link between the each representative image in the menu and the chapter has been discussed with reference to FIG. 11. By specifying the representative image instead of specifying the mark position in the PlayList, the reproducing process is performed in accordance with a predetermined content reproducing procedure. The movie object is specified from the index, and the navigation command contained in the movie object is executed. The reproducing process with a particular PlayList specified is thus performed.

A menu display process is performed in the process of a top menu "TopMenu" 401 in the index of FIG. 11. The top menu "TopMenu" 401 specifies a movie object #5 "mobj#5" 402, and executes a navigation command 403 contained in the movie object #5 "mobj#5" 402.

Figure 12:
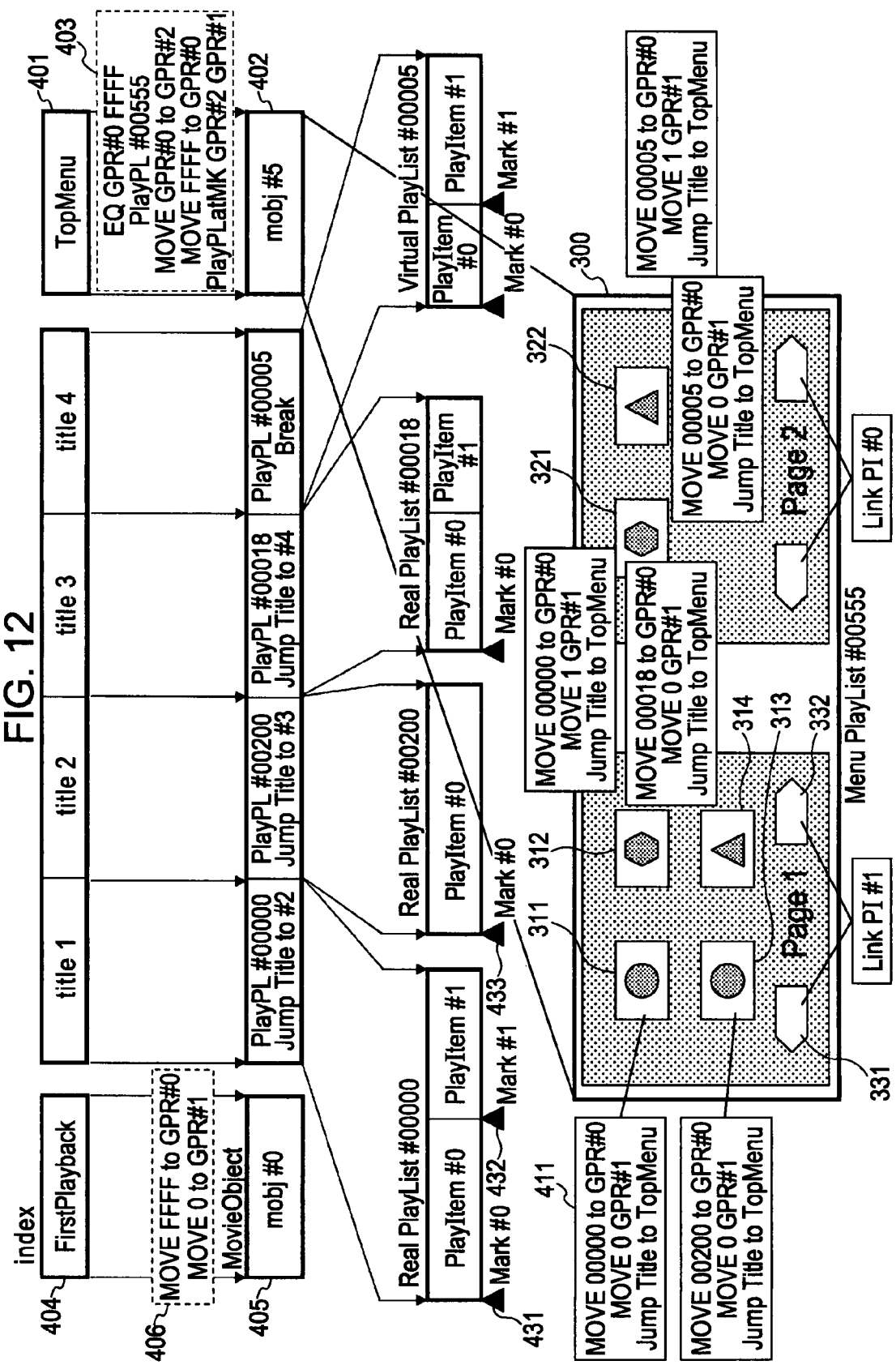
FIG. 12 illustrates a correspondence between a menu and a navigation command, and an execution process in accordance with one embodiment of the present invention.

As shown in FIG. 12, a navigation command 403 contained in the movie object #5 "mobj#5" 402 has the following structure:
 EQ GPR #0 FFFF
 PlayPL #00555
 MOVE GPR #0 to GPR #2
 MOVE FFFF to GPR #0
 PlayPlatMK GPR #2 GPR #1

GPR stands for general purpose register and a variety of values can be set in GPR #0 to GPR #n. The process to be performed is determined based on these values.

The navigation command 403 described above has the following meaning:

If the value of the register GPR #0 equals (EQ) "FFFF," a PlayList "#00555" is reproduced. If the value of the register GPR #0 does not equal "FFFF," the value of the register GPR #0 is moved to the register GPR #2, the value "FFFFF" is set in the register GPR #2, a PlayList identifier="value of the register GPR #2" and a mark identifier="value of the register GPR #1" are reproduced.

Initially, the value "FFFFF" is set in the register GPR #0. This is because when the information recording medium 180 is set, a command 406 of a movie object "mobj#0" 405 specified by a first playback "FirstPlayback" 404 of the index is executed. The command 406 includes:
 MOVE FFFF to GPR #0
 MOVE 0 to GPR #1

Initial setting is performed to set the value "FFFF" to the register GPR #0 and the value "0" is set to the register GPR #1. Initially, the value "FFFF" is set in the register GPR #0.

After the initial setting, the navigation command 403 contained in the movie object #5 "mobj#5" 402 is executed when the movie object #5 "mobj#5" 402 is specified by the top menu "TopMenu" 401. The value "FFFF" is set in the register GPR #0 and a PlayList "#00555" is performed. The PlayList "#00555" is a menu PlayList and the menu screen 300 is displayed as shown.

When the user specifies the representative image 311 in the menu display state, a command 411 corresponding to the representative image 311 is executed. The command 411 has the following structure:
 MOVE 00000 to GPR #0
 MOVE 0 to GPR #1
 Jump Title to TopMenu The meaning of the command 411 is as follows:
 set the value "00000" to the register GPR #0,
 set the value "0" to the register GPR #1,
 jump to the top menu "TopMenu."

When the user specifies the representative image 311, the command 411 is executed, and the command of the movie object "mobj#5" is executed again by the top menu "TopMenu." At this point of time, the value "00000" is set in the register GPR #0 and the value "0" is set in the register GPR #1. When the navigation command 403, namely,
 EQ GPR #0 FFFF
 PlayPL #00555
 MOVE GPR #0 to GPR #2
 MOVE FFFF to GPR #0
 PlayPlatMK GPR #2 GPR #1 is performed, the value of the register GPR #0 is "00000," the value "00000" of the register GPR #0 is moved to the register GPR #2, the value "FFFFF" is set in the register GPR #0, and the PlayList identifier="value of the register GPR #2=00000" and the mark identifier="value of the register GPR #1=0" are reproduced.

More specifically, the reproducing process starts at the position at the mark "#0" in the real PlayList "#00000." The mark is illustrated as a mark "#0" 431 of FIG. 12.

By specifying another representative image displayed on the menu, the command responsive to the representative image is executed. The playing of the chapter specified by the mark at the link destination discussed with reference to FIG. 11 thus starts. For example, the command linked to the representative image 312 on page 1 is as follows:
 MOVE 00000 to GPR #0
 MOVE 1 to GPR #1
 Jump Title to TopMenu The command has the following meaning:
 set the value "00000" to the register GPR #0,
 set the value "1" to the register GPR #1, and
 jump to the top menu "TopMenu."

When the user specifies the representative image 312, the above command is performed. The command of the movie object "mobj#5" is performed again on the tom menu "TopMenu." At this point of time, the value "00000" is set in the register GPR #0 and the value "1" is set in the register GPR #1. When the navigation command 403, namely,
 EQ GPR #0 FFFF
 PlayPL #00555
 MOVE GPR #0 to GPR #2
 MOVE FFFF to GPR #0
 PlayPlatMK GPR #2 GPR #1 is performed, the value of the register GPR #0 is "00000," the value "00000" of the register GPR #0 is moved to the register GPR #2, the value "FFFFF" is set in the register GPR #0, and the PlayList identifier="value of the register GPR #2=00000" and the mark identifier="value of the register GPR #1=1" are reproduced.

More specifically, the reproducing process starts at the position at the mark "#1" in the real PlayList "#00000." Content reproducing starts at a chapter start point indicated by a mark "#1" 432 of FIG. 12.

The command linked to the representative image 313 on page 1 is as follows:
MOVE 00200 to GPR #0
MOVE 0 to GPR #1
Jump Title to TopMenu When the user specifies the representative image 313, the above command is performed. The command of the movie object "mobj#5" is performed again on the tom menu "Top-Menu." At this point of time, the value "00200" is set in the register GPR #0 and the value "0" is set in the register GPR #1. When the navigation command 403, namely,
EQ GPR #0 FFFF
PlayPL #00555
MOVE GPR #0 to GPR #2
MOVE FFFF to GPR #0
PlayPlatMK GPR #2 GPR #1
is performed, the value of the register GPR #0 is "00200," the value "00200" of the register GPR #0 is moved to the register GPR #2, the value "FFFFF" is set in the register GPR #0, and the PlayList identifier="value of the register GPR #2=00200" and the mark identifier="value of the register GPR #1=0" are reproduced.

More specifically, the reproducing process starts at the position at the mark "#0" in the real PlayList "#00200." The reproducing process starts at a chapter start point indicated by a mark "#0" 433 of FIG. 12.

The command linked to the representative image 314 on page 1 is as follows:
MOVE 00018 to GPR #0
MOVE 0 to GPR #1
Jump Title to TopMenu When the user specifies the representative image 314, the above command is performed. The command of the movie object "mobj#5" is performed again on the tom menu "Top-Menu." At this point of time, the value "00018" is set in the register GPR #0 and the value "0" is set in the register GPR #1. When the navigation command 403, namely,
EQ GPR #0 FFFF
PlayPL #00555
MOVE GPR #0 to GPR #2
MOVE FFFF to GPR #0
PlayPlatMK GPR #2 GPR #1
is performed, the value of the register GPR #0 is "00018," the value "00018" of the register GPR #0 is moved to the register GPR #2, the value "FFFFF" is set in the register GPR #0, and the PlayList identifier="value of the register GPR #2=00018" and the mark identifier="value of the register GPR #1=0" are reproduced.

More specifically, the reproducing process starts at the position at the mark "#0" in the real PlayList "#00018."

The command linked to the representative image 321 on page 2 is as follows:
MOVE 00005 to GPR #0
MOVE 0 to GPR #1
Jump Title to TopMenu When the user specifies the representative image 321, the above command is performed. The command of the movie object "mobj#5" is performed again on the tom menu "Top-Menu." At this point of time, the value "00005" is set in the register GPR #0 and the value "0" is set in the register GPR #1. When the navigation command 403, namely,
EQ GPR #0 FFFF
PlayPL #00555
MOVE GPR #0 to GPR #2
MOVE FFFF to GPR #0
PlayPlatMK GPR #2 GPR #1
is performed, the value of the register GPR #0 is "00005," the value "00005" of the register GPR #0 is moved to the register GPR #2, the value "FFFFF" is set in the register GPR #0, and the PlayList identifier="value of the register GPR #2=00005" and the mark identifier="value of the register GPR #1=0" are reproduced.

More specifically, the reproducing process starts at the position at the mark "#0" in the real PlayList "#00005."

The command linked to the representative image 322 on page 2 is as follows:
MOVE 00005 to GPR #0
MOVE 1 to GPR #1
Jump Title to TopMenu When the user specifies the representative image 322, the above command is performed. The command of the movie object "mobj#5" is performed again on the tom menu "Top-Menu." At this point of time, the value "00005" is set in the register GPR #0 and the value "1" is set in the register GPR #1. When the navigation command 403, namely,
EQ GPR #0 FFFF
PlayPL #00555
MOVE GPR #0 to GPR #2
MOVE FFFF to GPR #0
PlayPlatMK GPR #2 GPR #1
is performed, the value of the register GPR #0 is "00005," the value "00005" of the register GPR #0 is moved to the register GPR #2, the value "FFFFF" is set in the register GPR #0, and the PlayList identifier="value of the register GPR #2=00005" and the mark identifier="value of the register GPR #1=1" are reproduced.

More specifically, the reproducing process start at the position at the mark "#1" in the real PlayList "#00005."

Content reproducing thus starts at the mark position linked in accordance with the command responsive to each representative image. The page turning icons 331 and 332 are used to issue the page turning commands thereof. When the user select one of the page switching icons 331 and 332, page turning is performed.

Figure 13:
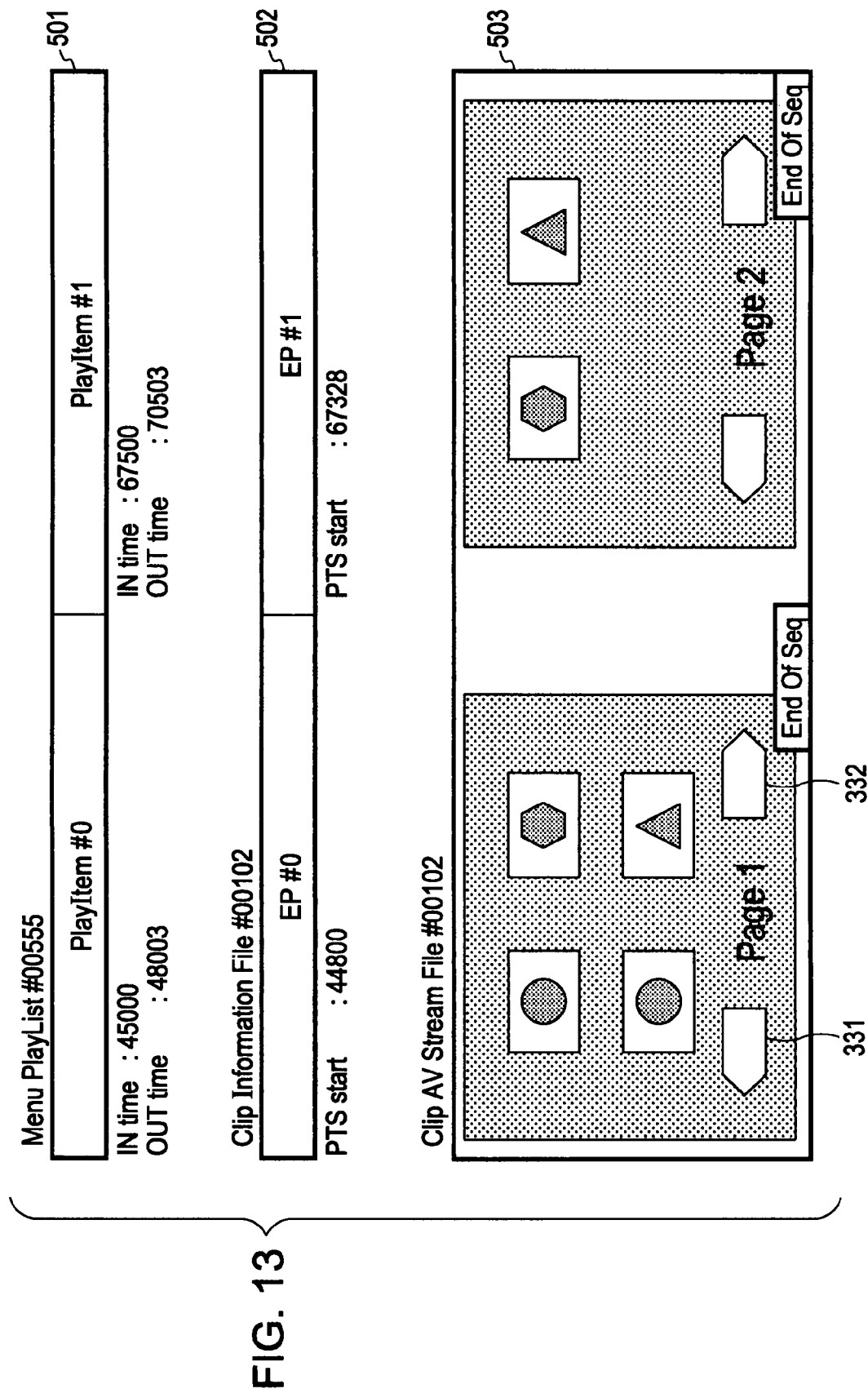
FIG. 13 illustrates a relationship of the menu, the play list, and clip information in accordance with one embodiment of the present invention.

FIG. 13 illustrates a correspondence between an AV stream file "#00102" as an image for the menu and a PlayList "#00555" as a menu PlayList. As previously discussed with reference to the menu production process of FIG. 10, the PlayList for the menu is produced during the menu production process. A PlayList "#00555" 501 of FIG. 13 is shown as the PlayList for the menu.

The display data for the menu is contained in a clip AV stream file "#00102" 503. The clip AV stream file "#00102" 503 contains the representative images. A clip information file responsive to the clip AV stream file "#00102" 503 is a clip information file "#00102" 502.

The clip information file corresponds to the clip AV stream file on a one-to-one correspondence basis and defines the attribute of the corresponding AV stream file. For example, the clip information file contains information relating to coding, size, time to address conversion, play management, time map, etc. The PlayList "#00555" 501 contains a PlayItem corresponding to each page of the menu. Since the number of pages is two in this case, the PlayList "#00555" 501 contains two PlayItems. Each PlayItem contains play start time information "IN time" and play end time information "OUT time."

The recording and reproducing controller 110 acquires a presentation timestamp (PTS) of the clip information file "#00102" 502 corresponding to the time information, and reproduces the AV stream specified by the acquired PTS.

The IN time and OUT time of the PlayItem "#0" of the PlayList "#00555" are 45000 and 48003, respectively. The recording and reproducing controller 110 acquires from the clip information file "#00102" 502 an entry point (EP) having a PTS start after and closest to the IN time (45000). In this case, an entry point "EP#0" having a PTS start=44800 is selected. The AV stream specified by the entry point "EP#0," namely page 1 in the AV stream 303 of the menu is reproduced and displayed. Similarly, the IN time and OUT time of a second PlayItem "#1" of the PlayList "#00555" are 67500 and 70503, respectively. The recording and reproducing controller 110 acquires an entry point (EP) having a PTS start after and closest to the IN time (67500). In this case, an entry point "EP#1" having a PTS start=67328 is selected. The AV stream specified by the entry point "EP#1," namely page 2 in the AV stream 303 of the menu is reproduced and displayed. Page turning is performed by selecting one of the page turning icons 331 and 332.

From the foregoing discussion, the data of the menu contains display image data corresponding to the chapters, icon data for page turning, and commands linked to the representative image data and the page turning icons. The data of the menu has a data structure composed of representative image data and an interactive graphic (IG) stream.

Figure 14:
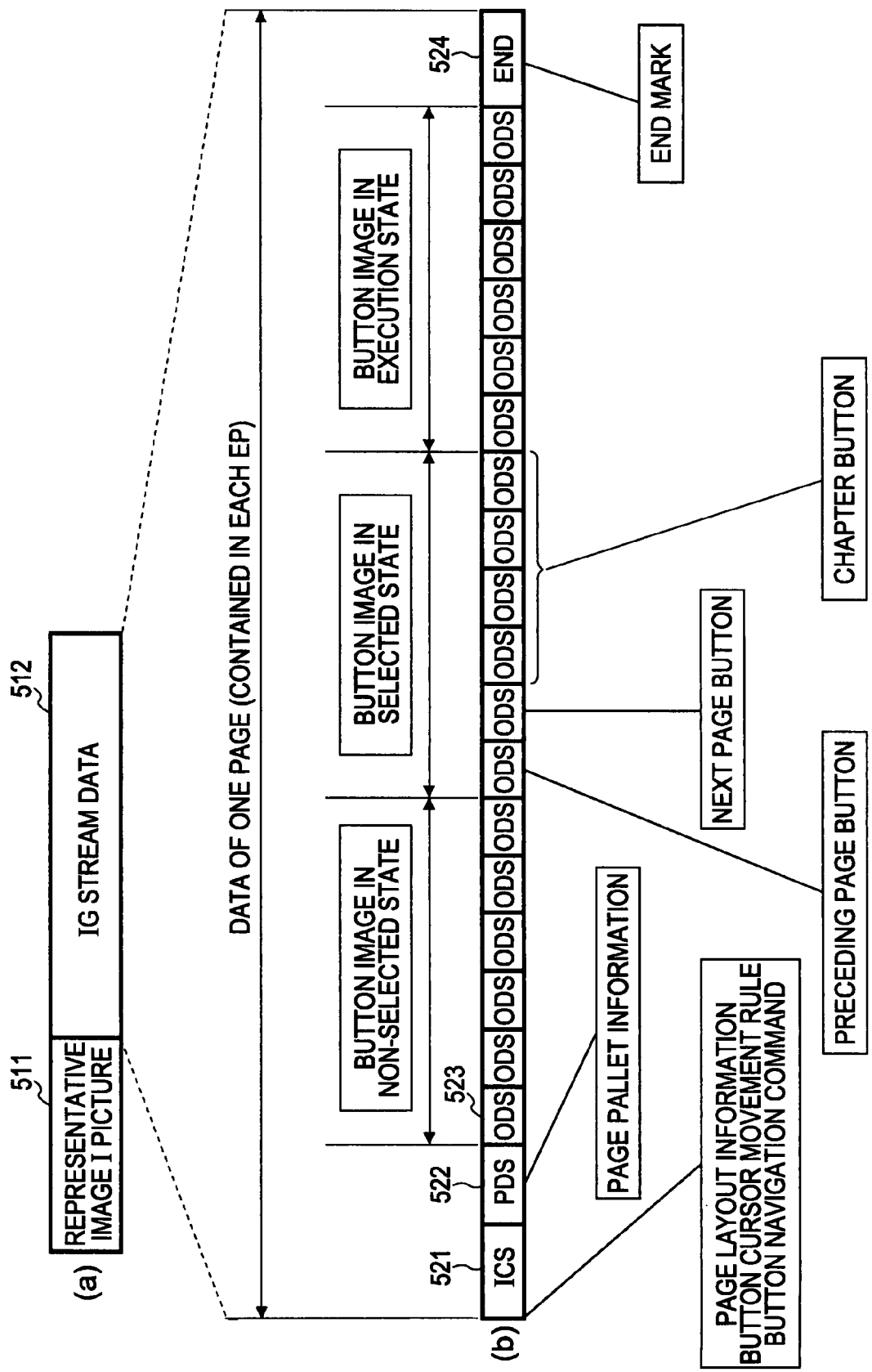
FIG. 14 illustrates an IG stream in the menu in accordance with one embodiment of the present invention.

The data structure of the IG stream for the menu is described with reference to FIG. 14. As shown in a portion (a) of FIG. 14, the menu data contains a representative image I picture 511 for each chapter and an interactive graphic (IG) stream 512. As shown in a portion (b) of FIG. 14, the IG stream has the data structure as follows:

interactive composition segment (ICS) 521,
pallet data segment (PDS) 522,
object definition segment (ODS) 523, and
end (END) mark 524.

The ICS 521 contains layout information, cursor movement rule of button, a navigation command for the button, etc. The command for the representative image discussed with reference to FIG. 12 is recorded in the ICS 521.

The PDS 522 contains pallet information of the page. The ODS 523 contains button image information regarding a preceding page button, a subsequent page button, and a chapter button in each of a non-selected state, a selected state, and an in-progress state. The END mark 524 contains information representing an end position of the IG stream.

The process for menu displaying and user operation to the menu are executed based on the data in the IG stream.

The present invention has been discussed with reference to specific embodiments. It will be apparent to those skilled in the art that changes and modifications are made to the present invention without departing from the scope of the present invention. The embodiments of the present invention have been discussed for exemplary purposes only, and are not intended to limit the scope of the present invention. The scope of the present invention is to be limited by the appended claims only.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

The program may be pre-stored on a hard disk or a ROM. The program may also be stored (recorded) temporarily or permanently on a removable recording medium such as a flexible disk, a compact disk read-only memory (CD-ROM), a magneto-optical (MO) disk, a digital versatile disk (DVD), a magnetic disk, or a semiconductor memory. Such a removable disk may be supplied as package software.

The program may be installed on the computer from the above-mentioned removable recording medium. Alternatively, the program may be transmitted from a download side to the computer in a wireless fashion or a wired fashion using a network such as the Internet. The computer receives such a transmitted program, and installs the program onto a recording medium such as a built-in hard disk.

The process steps describing the program may be performed in the time-series order sequence as previously stated. Alternatively, the process steps may be performed in parallel or separately. In the context of this specification, the system refers to a logical set of a plurality of apparatuses and is not necessarily a single apparatus in a single casing.

The invention claimed is:

1. An information processing apparatus comprising:
a controller including a processor for controlling the producing of a menu based on content recorded on a information recording medium,
the controller producing a menu that allows the content to be selected and reproduced by chapter, the chapter defined by a period from one mark to a next mark as content delimitation information for a play list set in play list information corresponding to the content recorded on the information recording medium, wherein the play list includes at least one play item specifying a play period defined by a start point and an end point of any portion of a clip, wherein the clip is a predetermined content data unit of the content registered for continuous playing in the play list information, wherein a reference relationship between the clip and the content delimitation information for the play list set in the play list information to define the chapter is freely set such that any of one or more play items of the play list can be referenced as the chapter, and controlling recording the menu that is produced on the information recording medium; and
a storage unit to store resource information relating to a resource that is required to produce the menu based on the content recorded on the information recording medium, the resource information indicating a preserved number and a maximum value for the resource, wherein the controller references the resource information during a process of recording new data onto the information recording medium or a process of editing of the content recorded on the information recording medium, and stops the process of recording of the new data or the process of editing of the content if the process of recording the new data or the process editing of the content can cause the resource to be lost.

2. The information processing apparatus according to claim 1, wherein the controller selects a representative image by chapter and produces the menu that allows the representative image to be displayed in a list by chapter.

3. The information processing apparatus according to claim 1, wherein the controller produces the menu that maps, to each representative image per chapter, a command to be applied to reproduce the content from the start of the chapter.

4. The information processing apparatus according to claim 1, wherein the controller produces the menu that sets a command for reproducing the content from the start of the chapter mapped to each representative image by executing a navigation command applied to the content reproducing based on a specified representative image per chapter displayed on the menu.

5. The information processing apparatus according to claim 1, wherein the controller produces the menu for reproducing the content from the start of the chapter mapped to each representative image by setting a register value setting command as a command corresponding to the representative image per chapter displayed on the menu, and executing a navigation command applied to the content reproducing in accordance with a register value.

6. The information processing apparatus according to claim 5, wherein the resource comprises an attribute information storage file including a play list information file defined by a data recording format to the information recording medium.

7. The information processing apparatus according to claim 6, wherein the resource comprises a storage capacity of the information recording medium storing information defined by the data recording format to the information recording medium.

8. The information processing apparatus according to one of claim 6 or 7, wherein the data recording format comprises an AVCHD format.

9. An information processing method comprising:
a step of controlling the producing of a menu based on content recorded on a information recording medium,
the controlling step including producing a menu that allows the content to be selected and reproduced by chapter, the chapter defined by a period from one mark to a next mark as content delimitation information for a play list set in play list information corresponding to the content recorded on the information recording medium, wherein the play list includes at least one play item specifying a play period defined by a start point and an end point of any portion of a clip, wherein the clip is a predetermined content data unit of the content registered for continuous playing in the play list information, wherein a reference relationship between the clip and the content delimitation information for the play list set in the play list information to define the chapter is freely set such that any one or more play items of the play list can be referenced as the chapter, and recording the menu that is produced on the information recording medium; and
a step of storing resource information relating to a resource that is required to produce the menu based on the content recorded on the information recording medium, the resource information indicating a preserved number and a maximum value for the resource,
wherein the controlling step includes referencing the resource information during a process of recording new data onto the information recording medium or a process of editing of the content recorded on the information recording medium, and stops the process of recording of the new data or the process of editing of the content if the process of recording of the new data or the process of editing of the content can cause the resource to be lost.

10. The information processing method according to claim 9, wherein the controlling step comprises selecting a representative image by chapter and producing the menu that allows the representative image to be displayed in a list by chapter.

11. The information processing method according to claim 9, wherein the controlling step comprises producing the menu that maps, to each representative image per chapter, a command to be applied to reproduce the content from the start of the chapter.

12. The information processing method according to claim 9, wherein the controlling step comprises producing the menu that sets a command for reproducing the content from the start of the chapter mapped to each representative image by executing a navigation command applied to the content reproducing based on a specified representative image per chapter displayed on the menu.

13. The information processing method according to claim 9, wherein the controlling step comprises producing the menu for reproducing the content from the start of the chapter mapped to each representative image by setting a register value setting command as a command corresponding to the representative image per chapter displayed on the menu, and executing a navigation command applied to the content reproducing in accordance with a register value.

14. The information processing method according to claim 9, wherein the resource comprises an attribute information storage file including a play list information file defined by a data recording format to the information recording medium.

15. The information processing method according to claim 9, wherein the resource comprises a storage capacity of the information recording medium storing information defined by the data recording format to the information recording medium.

16. The information processing method according to one of claim 14 or 15, wherein the data recording format comprises an AVCHD format.

17. A computer program on a recording medium for causing a computer to perform:
a step of controlling the producing of a menu based on content recorded on a information recording medium,
the controlling step including producing a menu that allows the content to be selected and reproduced by chapter, the chapter defined by a period from one mark to a next mark as content delimitation information for a play list set in play list information corresponding to the content recorded on the information recording medium, wherein the play list includes at least one play item specifying a play period defined by a start point and an end point of any portion of a clip, wherein the clip is a predetermined content data unit of the content registered for continuous playing in the play list information, wherein a reference relationship between the clip and the content delimitation information for the play list set in the play list information to define the chapter is freely set such that any one or more play items of the play list can be referenced as the chapter, and recording the menu that is produced on the information recording medium; and
a step of storing resource information relating to a resource that is required to produce the menu based on the content recorded on the information recording medium, the resource information indicating a preserved number and a maximum value for the resource,
wherein the controlling step includes referencing the resource information during a process of recording new data onto the information recording medium or a process of editing of the content recorded on the information recording medium, and stops the process of recording of the new data or the process of editing of the content if the process of recording of the new data or the process of editing of the content can cause the resource to be lost.

* * * * *